US007992081B2

(12) United States Patent
Medi et al.

(10) Patent No.: US 7,992,081 B2
(45) Date of Patent: Aug. 2, 2011

(54) STREAMING VALIDATION OF XML DOCUMENTS

(75) Inventors: Vijay Medi, Sunnyvale, CA (US); Nipun Agarwal, Santa Clara, CA (US); Ravi Murthy, Fremont, CA (US); Eric Sedlar, San Francisco, CA (US); Arkady Rabinov, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1248 days.

(21) Appl. No.: 11/407,508

(22) Filed: Apr. 19, 2006

(65) Prior Publication Data

US 2007/0250766 A1  Oct. 25, 2007

(51) Int. Cl.
G06F 17/21 (2006.01)
(52) U.S. Cl. ...................................................... 715/237
(58) Field of Classification Search .................... 715/237
See application file for complete search history.

(56) References Cited

U.S. PATENT DOCUMENTS

| | | | | |
|---|---|---|---|---|
| 6,643,650 | B1 | 11/2003 | Slaughter et al. ............... 707/10 |
| 6,655,593 | B2 | 12/2003 | Alleshouse ............... 235/462.01 |
| 6,763,499 | B1* | 7/2004 | Friedman et al. ............. 715/240 |
| 6,966,027 | B1* | 11/2005 | Krasinski ...................... 715/234 |
| 7,134,072 | B1* | 11/2006 | Lovett et al. .................. 715/234 |
| 7,299,408 | B1* | 11/2007 | Daconta et al. ............... 715/234 |
| 2002/0184145 | A1 | 12/2002 | Sijacic et al. |
| 2003/0018666 | A1 | 1/2003 | Chen et al. |
| 2003/0154444 | A1* | 8/2003 | Tozawa et al. ................. 715/513 |
| 2003/0159112 | A1 | 8/2003 | Fry |
| 2003/0163603 | A1 | 8/2003 | Fry et al. |
| 2003/0167446 | A1* | 9/2003 | Thomas ......................... 715/513 |
| 2003/0172348 | A1* | 9/2003 | Fry et al. ........................ 715/513 |
| 2004/0006744 | A1* | 1/2004 | Jones et al. .................... 715/514 |
| 2004/0064803 | A1* | 4/2004 | Graves et al. ................. 717/104 |
| 2004/0073870 | A1* | 4/2004 | Fuh et al. ....................... 715/513 |
| 2004/0194016 | A1* | 9/2004 | Liggitt ....................... 715/501.1 |
| 2004/0225647 | A1 | 11/2004 | Connelly et al. |
| 2004/0226002 | A1* | 11/2004 | Larcheveque et al. ........ 717/126 |
| 2004/0237039 | A1* | 11/2004 | Ueda et al. .................... 715/513 |
| 2005/0039124 | A1 | 2/2005 | Chu et al. |

(Continued)

OTHER PUBLICATIONS

Murata et al., Taxonomy of XML Schema Languages Using Formal Language Theory, Nov. 2005, ACM Transactions on Internet Technology, vol. 5, No. 4, pp. 660-704.*

(Continued)

Primary Examiner — Laurie Ries
Assistant Examiner — Frank D Mills
(74) Attorney, Agent, or Firm — Hickman Palermo Truong & Becker LLP

(57) ABSTRACT

A method and apparatus for streaming validation of XML documents is provided. A particular event of a series of events is received. The series of events is generated as an XML document is parsed by a parser, and the received particular event indicates that the parser has encountered a particular part of the XML document. The particular part of the XML document indicated by the particular event is then received. A current validation state for the XML document is determined. The current validation state, which is one of a plurality of validation states for the XML document, indicates a validation type associated with the particular part of the XML document. Based on at least the current validation state, the particular part of the XML document is validated against an XML schema that defines the structure of the XML document.

42 Claims, 7 Drawing Sheets

U.S. PATENT DOCUMENTS

| | | | |
|---|---|---|---|
| 2005/0039166 A1* | 2/2005 | Betts et al. | 717/114 |
| 2005/0055631 A1* | 3/2005 | Scardina et al. | 715/513 |
| 2005/0132342 A1* | 6/2005 | Van Lunteren | 717/143 |
| 2005/0138542 A1* | 6/2005 | Roe et al. | 715/513 |
| 2005/0177543 A1* | 8/2005 | Chen et al. | 707/1 |
| 2005/0177578 A1* | 8/2005 | Chen et al. | 707/100 |
| 2005/0246159 A1* | 11/2005 | Perla et al. | 704/8 |
| 2008/0040657 A1* | 2/2008 | Kuznetsov et al. | 715/234 |
| 2009/0150412 A1 | 6/2009 | Idicula et al. | |

OTHER PUBLICATIONS

Segoufin et al., Validating Streaming XML Documents, Jun. 3-6, 2002, ACM PODS 2002, pp. 53-64.*

Chitic et al., On Validation of XML Streams Using Finite State Machines, Jun. 17-18, 2004, Seventh International Workshop on the Web and Databases (WebDB 2004), pp. 85-90.*

"A Practice Guide for Building Enterprise XML Applications with Oracle Application Server 10g" *Oracle* (2005) pp. 1-15.

"XML Schema Part 0: Primer Second Edition" *W3C* (2004) pp. 1-81.

Zhang, et al., "TDX: A High Performance Table-driven XML Parser", In proceedings of the 44*th* annual (ACM) Southeast Regional Conference, Mar. 2006, ACM, 6 pages.

Balmin et al., "Incremental Validation of XML Documents", ACM Trans. Database System 24, Dec. 2004, 42 pages.

* cited by examiner

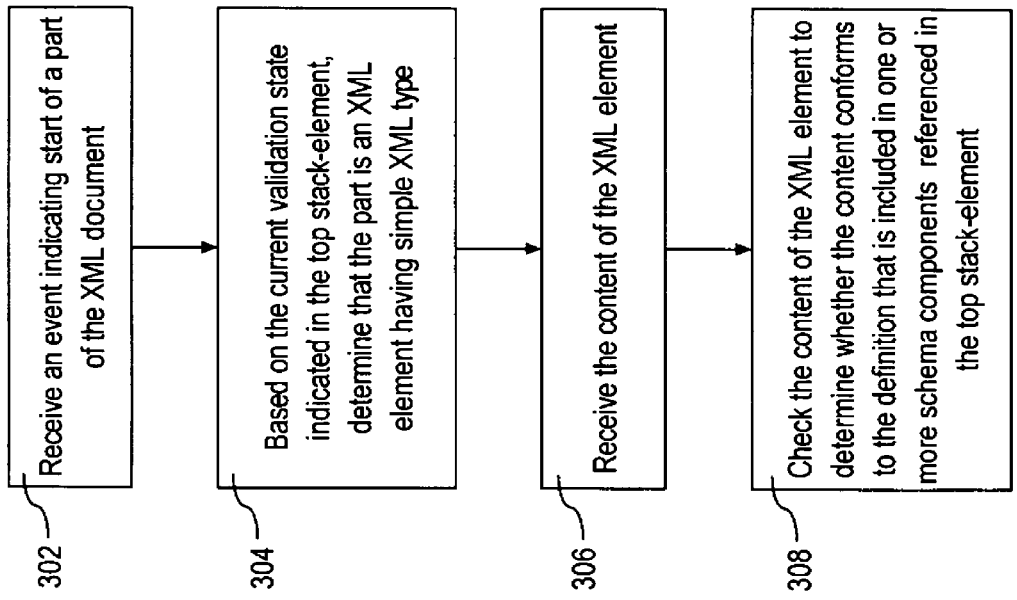

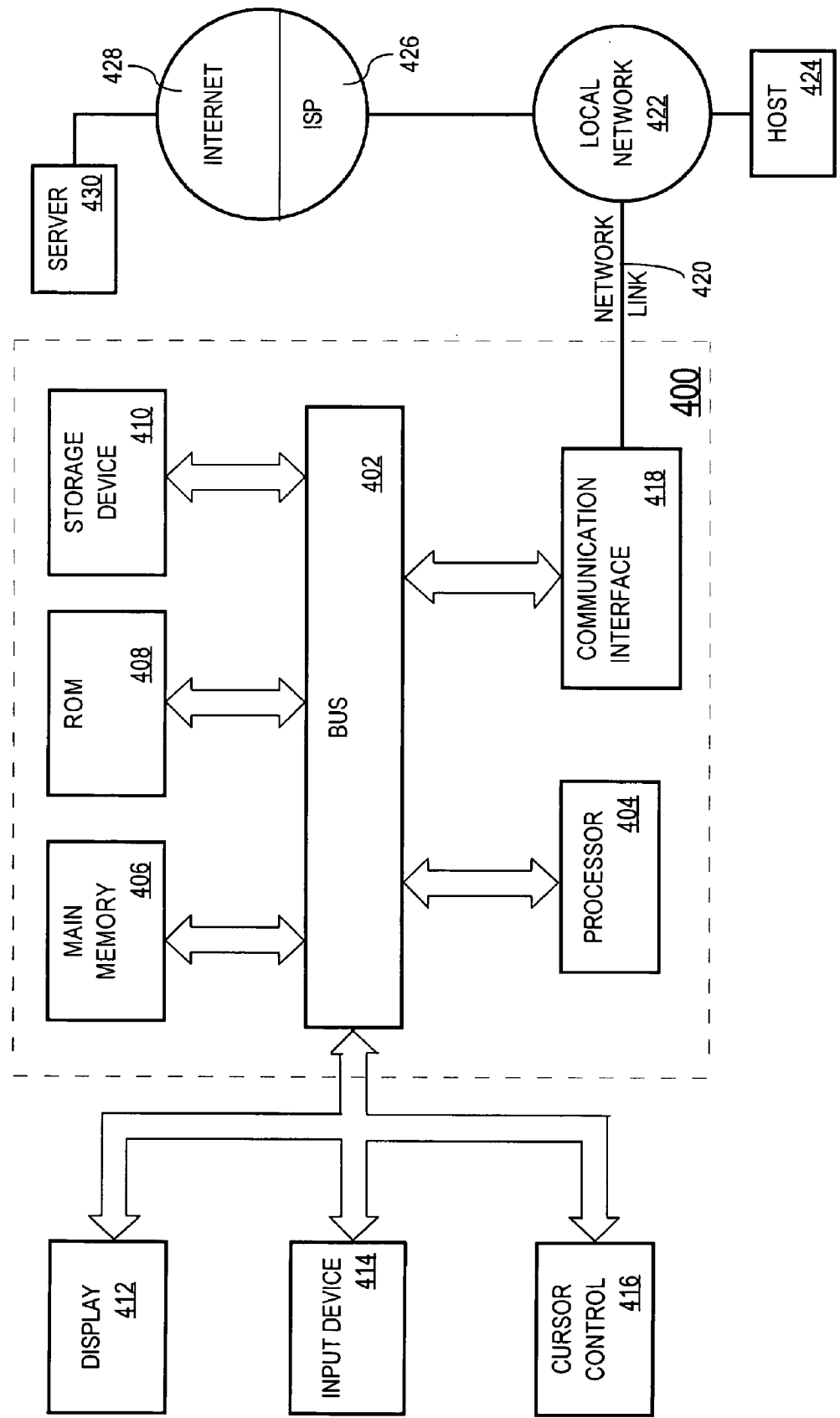

STREAMING VALIDATION OF XML DOCUMENTS

CROSS-REFERENCE TO RELATED APPLICATIONS

This application is related to U.S. patent application Ser. No. 10/798,474, entitled "TECHNIQUES FOR STREAMING VALIDATION-BASED XML PROCESSING", filed by Mark Vincent Scardina et al. on Mar. 10, 2004, the entire contents of which are hereby incorporated by reference for all purposes as if originally set forth herein.

FIELD OF THE INVENTION

The present invention generally relates to extensible Markup Language (XML). The invention relates more specifically to techniques for streaming validation of XML documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML Schema is one definition language that provides facilities for describing structure and constraining the contents of an XML document. A draft specification, referred to hereinafter as "XML Schema Specification", for the XML Schema definition language is described in a set of three documents published by the W3C Consortium. The first document in the set is "XML Schema Part 0: Primer Second Edition", W3C Working Draft 28 Oct. 2004, the entire contents of which are hereby incorporated by reference for all purposes as if fully set forth herein. The second document in the set is "XML Schema Part 1: Structures Second Edition", W3C Working Draft 28 Oct. 2004, the entire contents of which are hereby incorporated by reference for all purposes as if fully set forth herein. The third document in the set is "XML Schema Part 2: Datatypes Second Edition", W3C Working Draft 28 Oct. 2004, the entire contents of which are hereby incorporated by reference for all purposes as if fully set forth herein.

As referred to herein, an XML schema is a set of schema components that conforms to a definition language, such as, for example, the above-identified XML Schema Specification or any other proprietary or open-source Document Type Definition (DTD) language. A schema component is a block of data that provides a definition of an XML element or a portion of an XML element. Examples of schema components include, but are not limited to, schema components for type definitions, schema components for element declarations, and schema components for attribute declarations.

XML schemas are typically used for validation of XML documents. As used herein, validation refers to the process of determining whether a portion of an XML document (such as, for example, an entire XML document, an XML element included in an XML document, a sub-element of an XML element, or an attribute of an XML element) conforms to the definition and constraints specified in the relevant schema components of an XML schema. The validation of a specific portion of an XML document may return a validation result which, depending on the particular implementation, may comprise one or more values that indicate a successful or a failed validation outcome. In addition, the validation result may also comprise an overall validation outcome for a particular portion of an XML document that includes one or more sub-portions (e.g. for an XML element that includes sub-elements.)

Typically, the validation of an XML document against an XML schema is performed by one or more software components, collectively referred to as a schema validator. In one approach referred to as the Document Object Model (DOM) approach, a schema validator first builds in memory a DOM tree that represents the XML document. After building the DOM tree in memory, the schema validator traverses the DOM tree in a recursive descent fashion and validates the various portions of the XML document against the XML schema.

The DOM approach for validating XML documents, however, has several disadvantages. One disadvantage of the DOM approach is that it needs an entire XML document before the DOM tree can be built and the validation of the XML document can be started. This, however, makes the DOM approach unsuitable for use in conjunction with a StAX-based XML parser. Streaming API for XML (StAX) is generally an event-driven Application Programming Interface (API) that provides entities with handlers to request parsing events and other information as an XML document is parsed. The parsing events reported by a StAX parser may be any events that the parser encounters during the parsing of an XML document. Examples of such parsing events include, but are not limited to, start-element event, characters event, and end-element event. Thus, if a DOM approach is used to validate an XML document that is parsed by a StAX parser, all the benefits of parsing the document in an event-based fashion are lost.

Another disadvantage of the DOM approach for validating XML documents is that an in-memory DOM tree does not scale very well for large documents. The larger the size of an XML document, the more memory is required by the schema validator to validate the document. In some cases, it may not even be possible to validate large XML documents because the memory requirements for the DOM tree would be prohibitive.

Another disadvantage of the DOM approach is that it adversely affects the performance of the computer system on which the approach is implemented. As the memory used in validating an XML document increases proportionately to the size of the document, the cost of allocating memory for the DOM tree and the cost of traversing the tree significantly impedes the performance of the schema validator in particular, and of the computer system in general. Further, during the validation of an XML document, a schema validator implementing the DOM approach typically traverses a DOM tree multiple times, which impedes performance even further.

Based on the foregoing, there is a clear need for techniques that provide validation of XML documents that overcome the disadvantages of the DOM approach. In addition, there is a clear need for techniques that provide for streaming validation of XML documents against XML schemas that allow for defining a wide variety of XML structures and constraints, such as, for example, XML schemas that conform to the XML Schema Specification.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a flow diagram that illustrates one embodiment of a method for validating XML elements associated with simple XML types;

FIG. 4 is a block diagram that illustrates a computer system upon which an embodiment may be implemented.

DETAILED DESCRIPTION

Figure 1A:
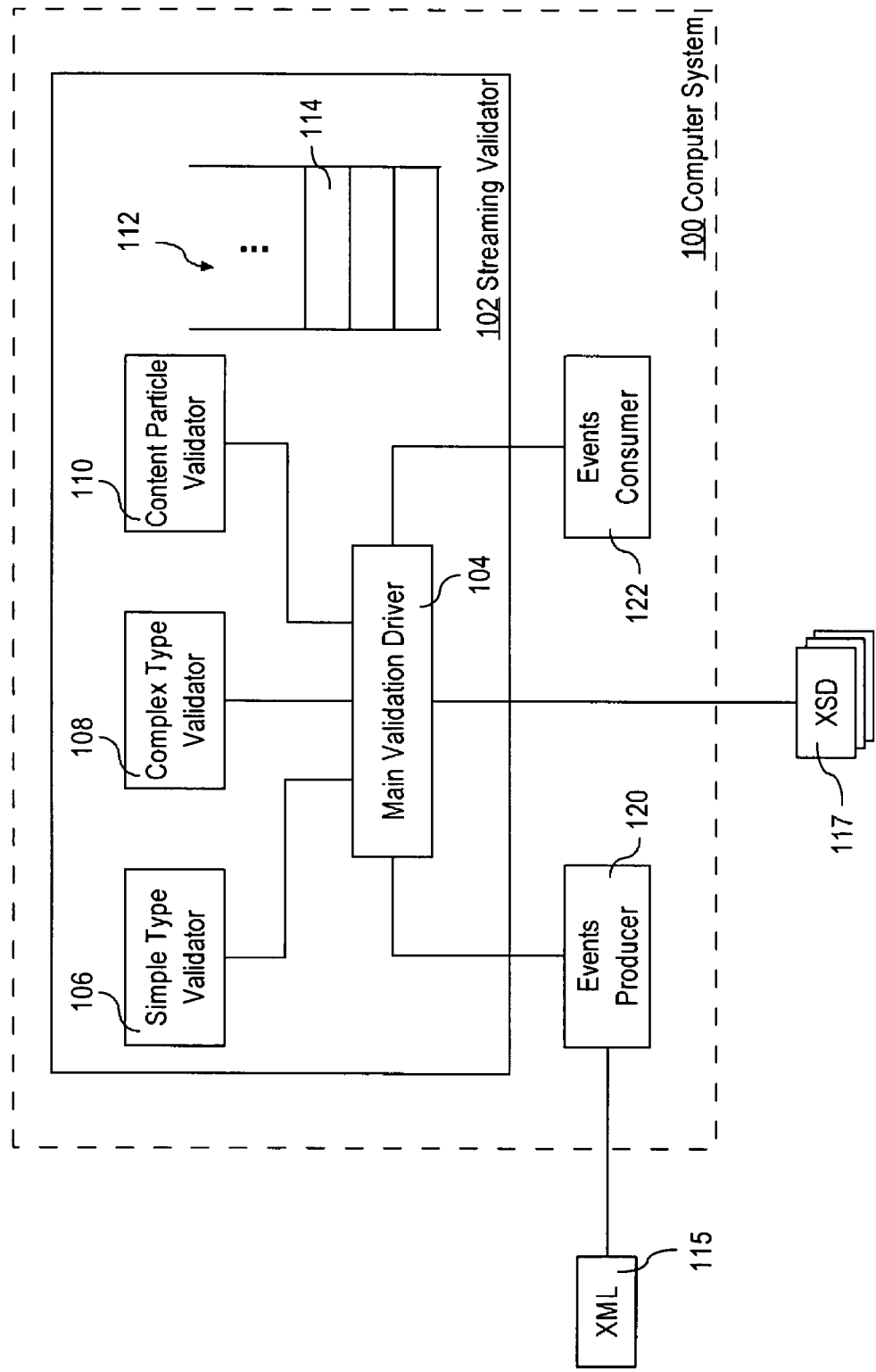
FIG. 1A is a block diagram that illustrates a high level overview of a computer system in which one embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Validation Types

The techniques described herein provide for streaming validation of XML documents against XML schemas that allow for defining a wide variety of XML structures and constraints. Examples of such XML schemas include, but are not limited to, schemas that conform to the XML Schema Specification and schemas that conform to any now known or later developed DTD language.

As used herein, the term "XML document" refers to an instance of XML information that is defined in an XML schema. In some embodiments, an instance of XML information may be an XML document that is stored as a file. In other embodiments, an instance of an XML information may exist as a document stored in one or more fields of one or more database records, as one or more streams of bytes sent between applications, or as one or more collections of XML Infoset information items. Thus, the techniques for streaming validation of XML documents described herein are not restricted to being implemented for any particular type of XML documents.

According to the techniques described herein, an XML schema may include schema components that define an XML element and indicate that the XML element is associated with a validation type that is a simple XML type, a complex XML type, or a content particle type. As referred to herein, an XML element is a portion of an XML document that is delimited by a pair of tags. The data included between the tags is referred to as the content of the XML element. The content of the XML element may be data having a built-in or a user-defined datatype, or it may include one or more sub-elements that are themselves properly defined XML elements. In addition, an XML element may include, in its opening tag, one or more name-value pairs that are referred to as attributes.

As used herein, "simple XML type" refers to a validation type that does not allow an XML element to include any attributes in its opening tag or any sub-elements in its content. The content of an XML element associated with a simple XML type is data that has a built-in or a user-defined datatype, or any derivative datatype thereof. According to the XML Schema Specification, examples of such built-in or user-defined datatypes include, but are not limited to, "string" datatype, "decimal" datatype, "integer" datatype, "long" datatype, "double" datatype, "boolean" datatype", "date" datatype, "datetime" datatype, "QName" datatype, "ENTITY" datatype, "NOTATION" datatype, list datatypes, and union datatypes, to name a few. In an XML schema, a simple XML type is declared by one or more schema components that identify a particular datatype, and that may provide one or more constraints on data of that particular data type.

As used herein, "complex XML type" refers to a validation type that allows an XML element to include any number of attributes in its opening tag and/or any number of sub-elements in its content. In an XML schema, a complex XML type is declared by one or more schema components that define one or more attributes and/or the structure of one or more sub-elements that may be included in the content of an XML element of the complex XML type. The one or more schema components declaring a particular complex XML type may include one or more constraints on the names, numbers, and content of any attributes and any sub-elements associated with that particular complex XML type. In a schema component, such constraints may be declared by using one or more component attributes and/or one or more schema sub-components. Examples of such complex XML type constraints include, but are not limited to, occurrence constraints that govern the number of times a sub-element or a content particle may appear in an XML element of the complex XML type.

A content particle is an XML document part that is included in the content of an XML element. Thus, as used herein, "content particle type" refers to the validation type of a content particle that is included as a sub-element, or a part, of an XML element. In an XML schema, a content particle is defined by one or more content particle schema components; according to the XML Schema Specification, examples of content particle schema components include, but are not limited to, "choice" schema components, "sequence" schema components, "all" schema components, "group" schema components, and wildcard, or "any" schema components. A content particle schema component declares the structure of a content particle, and may include one or more component attributes and/or schema sub-components to constrain the content of the XML element. According to the XML Schema Specification, examples of component attributes that constrain the content of a content particle include, but are not limited to, "minOccurs" attribute which governs the minimum number of times the content particle must appear in its parent XML element and "maxOccurs" attribute which governs the maximum number of times the content particle may appear in its parent XML element.

Structure Overview

The techniques described herein provide for a part-by-part validation of an XML document. As used hereinafter, a "part" of an XML document refers to any portion of an XML document that can be defined in one or more schema components of an XML schema. Examples of XML document parts include, but are not limited to, XML elements, XML element attributes, content particles, and XML entities.

FIG. 1A is a block diagram that illustrates a high level overview of a computer system in which one embodiment may be implemented. The embodiment depicted in FIG. 1A is implemented using one or more computer programs running on a computer system such as a database server. Thus, in this embodiment, the computer system 100 is a database server. In other embodiments, computer system 100 may be any system that is capable of accessing, modifying, managing, processing, validating, storing, transforming, and/or transmitting XML information. Examples of such computer systems include, but are not limited to, data warehousing systems, file servers, web servers, e-mail servers, middle-tier application servers, content-caching servers, and print servers.

In computer system 100, streaming validator 102 is communicatively and/or operatively connected to an events producer 120 and an events consumer 122. For the purpose of explanation, an embodiment shall be described hereinafter in which the events produced by events producer 120 are based on the Simple API for XML (SAX).

Events producer 120 is a software and/or hardware component that is capable of producing a series of events that correspond to parts of an XML document. Events consumer 122 is a software and/or hardware component that is capable of receiving SAX-based events from an events producer, such as, for example, streaming validator 102 or events producer 120.

Event-based parsing of XML documents may be implemented according to two models—SAX and StAX. Thus, one example of an events producer may be a SAX parser. As used herein, a SAX parser refers to a push-based parser which, while parsing an XML document, generates events corresponding to the parts of the XML document that it encounters (such as, for example, start-element events, end-element events, characters events, etc.) and reports these events to SAX events consumers. Another example of an events producer is a StAX parser. As used herein, a StAX parser refers to a pull-based parser that provides a StAX event consumer with a mechanism to pull, or request, events from the parser and to query the parser for more information regarding an event corresponding to a part of an XML document that is encountered by the parser.

Streaming validator 102 is a software and/or hardware component included in computer system 100 that is capable of validating an XML document part by part, where a particular part of an XML document is validated based on information maintained by the streaming validator.

In the embodiment depicted in FIG. 1A, streaming validator 102 comprises stack 112, which is used for storing information that facilitates part-by-part validation. Stack 112 is a First-In-Last-Out (FILO) data structure that is stored in a computer-readable medium, such as, for example, volatile memory. Stack 112 is configured for storing one or more stack-elements, such as, for example, stack-element 114. During the validation of an XML document, the top stack-element on stack 112 stores information that is needed to validate the current part of the XML document. The information stored in a stack-element may include, but is not limited to, a validation state that indicates the validation type of an XML document part, references to one or more schema components that define that XML document part, and one or more occurrence counts associated with that XML document part.

Streaming validator 102 also comprises main validation driver 104, simple type validator 106, complex type validator 108, and content particle validator 110. Each of main validation driver 104, simple type validator 106, complex type validator 108, and content particle validator 110 may be implemented as one or more software components capable of being executed in computer system 100. In the embodiment depicted in FIG. 1A, main validation driver 104 is communicatively connected to events producer 120 and events consumer 122, and is also capable of accessing one or more XML schemas, such as, for example, XML schema 117. Main validation driver 104 is configured to receive events from events producer 120 as an XML document is parsed, and to pass these events to events consumer 122.

In operation, main validation driver 104 controls the flow of the validation of an XML document. Main validation driver 104 receives an event from events producer 120, which event indicates that the events producer is beginning to parse an XML document, such as, for example, XML document 115. Based on the received event, main validation driver 104 may determine an XML schema against which XML document 115 needs to be validated, such as, for example, XSD 117. XSD 117 may be stored on computer-readable medium that may or may not be controlled by computer system 100. For example, XSD 117 may be stored in persistent storage accessible by computer system 100, or it may be stored on a website across a network. After XSD 117 is identified as the XML schema against which XML document 115 is to be validated, computer system 100 or streaming validator 102 may store a representation of the XML schema in volatile memory. In addition, if events producer 120 is a StAX parser, main validation driver 104 may request from the parser additional information regarding XML document 115 and/or XSD 117.

After receiving a start-document event from events producer 120, main validation driver 104 creates and initializes stack 112, and stores on the stack one or more stack-elements that indicate the current validation state for XML document 115. Thereafter, main validation driver 104 monitors the events received from events producer 120. Based on information stored in stack 112, main validation driver determines whether a particular part of an XML document, which is associated with a received event, needs to be validated. If a particular part needs to be validated, main validation driver 104 determines the current validation state of the XML document for that particular part based on the information stored in the top stack-element of stack 112. Based on the current validation state, main validation driver 104 then dispatches the particular part for validation to one of simple type validator 106, complex type validator 108, or content particle validator 110.

If the current validation state indicates that the particular part of the XML document being validated is associated with a simple XML type, then main validation driver 104 dispatches the part to simple type validator 106. If the current validation state indicates that the particular part of the XML document being validated is associated with a complex XML type, then main validation driver 104 dispatches the part to complex type validator 108. If the current validation state indicates that the particular part of the XML document being validated is associated with a content particle type, then main validation driver 104 dispatches the part to content particle validator 106. After the particular part is validated, main validation driver 104 may receive and process the validation result from the validation. For example, main validation driver 104 may process the validation result by recording it, and/or by augmenting it to a received event and then passing the event to events consumer 122.

Validation States and Stack-Based Validation State Machine

Figure 1B:
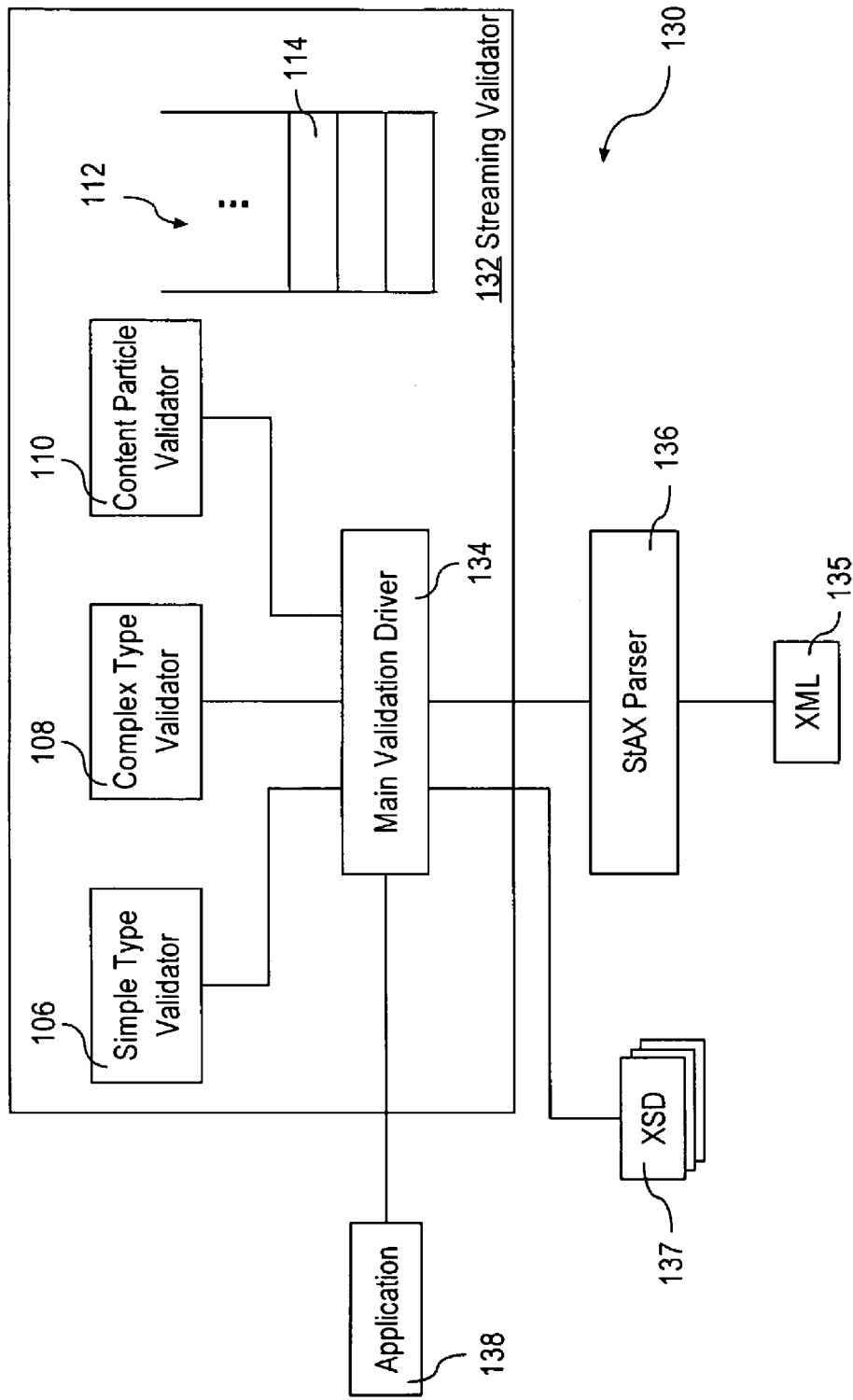
FIG. 1B is a block diagram that illustrates a high level overview of a system in which another embodiment may be implemented.

In the embodiments depicted in FIGS. 1A and 1B, a streaming validator implementing the techniques described herein uses a stack to maintain information that is needed to facilitate part-by-part validation of XML documents. In other embodiments, however, the techniques described herein may be implemented by using data structures different than a stack to maintain such information, such as, for example, tables, structured records, and lists. Thus, the use of a stack to facilitate streaming validation of XML documents described herein is to be regarded in an illustrative rather than a restrictive sense.

The techniques described herein provide for part-by-part validation of an XML document. A streaming validator, such as streaming validator 102 depicted in FIG. 1A, receives events generated by a parser as the XML document is parsed. For the purposes of validation, the streaming validator needs to consider at least the following SAX-based events: start-document, end-document, start-element, end-element, characters, start-entity, end-entity, and entity-reference. Other events may be ignored for validation purposes; for example, in the embodiment illustrated in FIG. 1A, streaming validator 102 may pass through such other events to events consumer 122. When the streaming validator receives an event which indicates that the parser has encountered a particular part of the XML document which needs to be validated, the streaming validator checks the top stack-element stored on the stack to determine the current validation state for the XML document, and based at least on the current validation state, validates the particular part against one or more schema elements that are indicated in the top stack-element. In effect, the events generated by the parser provide a narrow window into the XML document as the parsing of the document proceeds along. The streaming validator considers these events sequentially and validates the XML document one part at a time.

A stack-element is an entry in the stack that includes information indicating a validation state for the XML document, a reference to one or more schema components that include the definition of the particular part of the XML document being validated, and any other information that may be needed for validating that particular part, such as, for example, occurrence counts that indicate the number of times the particular part has already been encountered. The stack-elements on the stack strictly follow the definition of the XML document in the XML schema against which the XML document is being validated. At any given point during the validation, the top, or current, stack-element indicates the event that is expected to be received next. For example, if the next event to be received is a start-element event that is associated with a particular XML element, the top stack-element indicates that the particular XML element, when received, is the current part of the XML document that is being validated.

As referred to herein, a validation state for an XML document reflects the position of the validation process in the XML document relative to the XML schema against which the XML document is being validated. Based on the current validation state, the streaming validator can check in the XML schema what part of the XML document is to be received next. A validation state for an XML document also indicates the validation type of the XML document part that is to be received next. In one embodiment, a validation state may be associated in a stack-element with a name or other identifier of an XML document part to which it pertains. For example, a stack-element may store a "STATE" and "part_name" values, where the "part_name" value indicates the name of the particular part of an XML document being validated, and the "STATE" value indicates the validation type of that part.

In one embodiment, the following validation states are defined:
STATE_START_DOCUMENT—indicates the beginning of the validation for an XML document. A stack-element indicating this validation state is stored on the stack when a start-document event is encountered;
STATE_SIMPLE—indicates that the next XML document part to be validated is associated with a simple XML type;
STATE_COMPLEX—indicates that the next XML document part to be validated is associated with a complex XML type;
STATE_ELEMENT—indicates that the next XML document part to be validated is an element content particle that is associated with a particular content particle type;
STATE_SEQUENCE—indicates that the next XML document part to be validated is a sequence content particle that is associated with a sequence content particle type;
STATE_CHOICE—indicates that the next XML document part to be validated is a choice content particle that is associated with a choice content particle type;
STATE_GROUP—indicates that the next XML document part to be validated is a group content particle that is associated with a group content particle type;
STATE_ALL—indicates that the next XML document part to be validated is a validate-all content particle that is associated with a specific content particle type. (A validate-all content particle is a particle for which all sub-elements must match the corresponding definition in the XML schema regardless of their order.);
STATE_ANY—indicates that the next XML document part to be validated is a wildcard, or validate-any, content particle that is associated with a specific content particle type. (A validate-any content particle is a particle for which any sub-element may match the corresponding definition in the XML schema.);
STATE_END_DOCUMENT—indicates the end of validation for an XML document. A stack-element indicating this validation state is stored on the stack when an end-document event is encountered.

When the streaming validator receives a start-element event, the streaming validator begins the validation of the XML element associated with that start-element event against the specified XML schema. In the process of validating the XML element, the streaming validator or a component thereof may store or remove one or more stack-elements from the stack to reflect validation states associated with the validation of any sub-elements that may be included in the XML element. During validation, the streaming validator or a component thereof matches the received XML element or sub-element with the corresponding definition included in one or more schema components of the XML schema, which are indicated in the stack-element that is on top of the stack. If a match is found and the XML element or sub-element conforms to the definition indicated by the top stack-element, the streaming validator may pass through the event indicating a successful validation. If no match to the definition is found or if the XML element or sub-element does not conform to the restrictions specified in the definition, an error event may be generated by the streaming validator.

On an end-element event associated with the XML element or sub-element, the streaming validator or a component thereof adjusts the stack accordingly by removing one or more stack-elements and restoring the stack to the stack-element that is associated with the XML element or sub-element that just ended. In addition, in some cases the stack may be restored to the stack-element that is associated with the parent of the XML element that just ended. For example, if on an end-element event the occurrence count associated with the just validated XML element is equal to the maximum value allowed by the corresponding XML schema component (e.g. is equal to the value of the "maxOccurs" schema component attribute), then the stack may be restored to the stack-element associated with the parent of the just validated XML element. Further, based on the XML schema and on the stack-element that now remains on top of the stack, the streaming validator or a component thereof determines the next XML element or sub-element that is to be received, and stores on the stack one or more stack-elements that indicate one or more schema components which include the definition of that next XML element or sub-element. In this way, the streaming validator maintains the stack to indicate the position of the validation process in the XML document being validated relative to the XML schema, even though the streaming validator can "see" (e.g. receive from the parser) only one XML element or sub-element at a time.

Streaming Validator Operating Modes

A streaming validator implementing the techniques for streaming validation of XML documents described herein may operate in a plurality of modes including, but not limited to, pipeline mode and standalone mode. Depending on the particular requirements of the particular implementation of the techniques described herein, a streaming validator may operate in a variety of operating modes that are variations of the pipeline and/or standalone modes described hereinafter. Thus, the streaming validator operating modes described in this section are to be regarded in an illustrative, rather than a restrictive sense.

In pipeline mode, a streaming validator is both a consumer and a producer of SAX-based events—the streaming validator may receive input events (for example, events which are generated as an XML document is parsed) and may transmit some or all of the received events as output events to one or more event consumers. In addition, in pipeline mode a streaming validator may also augment any output event with additional information, such as, for example, the type of the XML document part that is associated with that output event and any validation results if validation was performed for that XML document part. Since a streaming validator operating in a pipeline mode is both a consumer and a producer of events, validation can be added as an extra step in any event pipeline. For example, an event pipeline may include parsing, followed by validation, followed by transformation, followed again by validation (e.g. validation of the transformed document). This form of pipelined streaming processing and evaluation of XML documents can be very efficient within computer systems that process large amounts of XML information, such as, for example, database servers and data warehousing systems.

In the embodiment depicted in FIG. 1A, streaming validator 102 validates XML documents in a streaming fashion by operating in pipeline mode. In this embodiment, streaming validator 102 may be implemented as one or more software components that are capable of being executed in computer system 100. As illustrated in FIG. 1A, events producer 120 parses XML document 115 and generates a series of events. As the parsing of XML document 115 moves along, events producer 120 passes the events to streaming validator 102. As streaming validator 102 receives each event, it determines whether the event indicates that the corresponding part of XML document 115 needs to be validated against an XML schema, such as, for example, XML schema 117.

If a received event does not indicate that validation needs to be performed, streaming validator 102 passes the event to events consumer 122. (An example of an event that does not indicate that validation is necessary is a start-comment event.) If a received event indicates that validation needs to be performed, streaming validator 102 receives and validates the part of the XML document associated with that event. In addition, streaming validator 102 may also pass the event to events consumer 122. After validating a part of XML document 115 in this manner, streaming validator 102 may generate a validation result for that part, and may augment one or more events associated with that part before sending these one or more events to events consumer 122.

In standalone mode, a caller, such as an application or a process, invokes the streaming validator to validate a particular XML document. The streaming validator locates the XML schema against which the XML document is to be validated, and invokes an event-based parser to parse the XML document. Thereafter, the streaming validator receives a series of events from the parser as the parser parses the XML document. Based on the received events, the streaming validator validates each part of the XML document against the XML schema and records or logs the validation result for each part. Based on the validation results for each part of the XML document, at the end of validation the streaming validator generates an overall validation result for the entire XML document, where the overall validation result may indicate a successful or a failed validation. In addition, the streaming validator may also generate a log of the encountered errors. The streaming validator then returns the overall validation result to the caller. A streaming validator operating in standalone mode may be very useful in operational contexts that can benefit from on-demand validation of XML documents.

One embodiment of a streaming validator operating in standalone mode is depicted in FIG. 1B. In FIG. 1B, streaming validator 134 is configured to validate XML documents in standalone mode. In this embodiment, streaming validator 134 may be implemented as a library of functions that are capable of being invoked from applications or processes executing in system 130. In other embodiments, a streaming validator operating in standalone mode may be implemented in a variety of ways including, but not limited to, as a separate software application, as an application executing in a virtual machine (e.g. a JAVA virtual machine), and as a service executing in a computer system.

In FIG. 1B, streaming validator 132 comprises main validation driver 134, simple type validator 106, complex type validator 108, and content particle validator 110. Streaming validator 132 also comprises stack 112, which is capable of storing one or more stack elements such as stack-element 114. Simple type validator 106, complex type validator 108, content particle validator 110, and stack 112 have similar functionalities and perform in an identical manner as the correspondingly referenced components described with respect to the embodiment depicted in FIG. 1A.

As illustrated in FIG. 1B, main validation driver 134 is capable of accessing one or more XML schemas, such as, for example, XSD 137. Main validation driver 134 is also communicatively connected to one or more applications or processes, such as, for example, application 138, which may be executing in the same or a different computer system. In addition, main validation driver 134 is also communicatively connected to an event-based XML parser. In the embodiment depicted in FIG. 1B, main validation driver 134 is communicatively connected to StAX parser 136. In other embodiments, the main validation driver of a streaming validator executing in standalone mode may be communicatively connected to a different type of XML parser, such as a SAX parser, that may be executing in the same or a different computer system as the streaming validator.

In operation, application 138 sends a request to streaming validator 132 to validate XML document 135, where the request includes information indicating that XML document 115 needs to be validated against XSD 137. Main validation driver 134 receives the request and initializes stack 112. In addition, main validation driver 134 may also build a representation of XSD 137 in volatile memory. Main validation driver 134 then invokes StAX parser 136 with instructions to begin parsing XML document 135.

As the parsing of XML document 135 moves along, main validator driver 134 requests the series of parsing events from StAX parser 136. When main validation driver 134 receives an event, it determines whether the event indicates that the part of the XML document to be received next needs to be validated. If the received event does not indicate that validation is necessary, main validation driver 134 drops the event and requests the next event from StAX parser 136.

If the received event indicates that the part of the XML document to be received next needs to be validated, main validation driver 134 receives that particular part and determines the current validation state of XML document 135 for that part based on the information stored in the top stack-element of stack 112. Based on the current validation state, main validation driver 104 then dispatches the particular part for validation to one of simple type validator 106, complex type validator 108, or content particle validator 110. After the particular part is validated, main validation driver 134 receives and stores the validation result for that particular part.

When main validation driver 134 receives from StAX parser 136 an end-document event which indicates that parsing is complete, the main validation driver generates an overall validation result for the validation of the entire XML document 115 based on the stored validation results for each validated part of the document. Main validation driver 134 then includes the overall validation result in a response, and sends the response to application 138. In this manner, streaming validator 132 performs part-by-part validation of XML document 135 in a standalone mode.

Method for Streaming Validation of XML Documents

Figure 2:
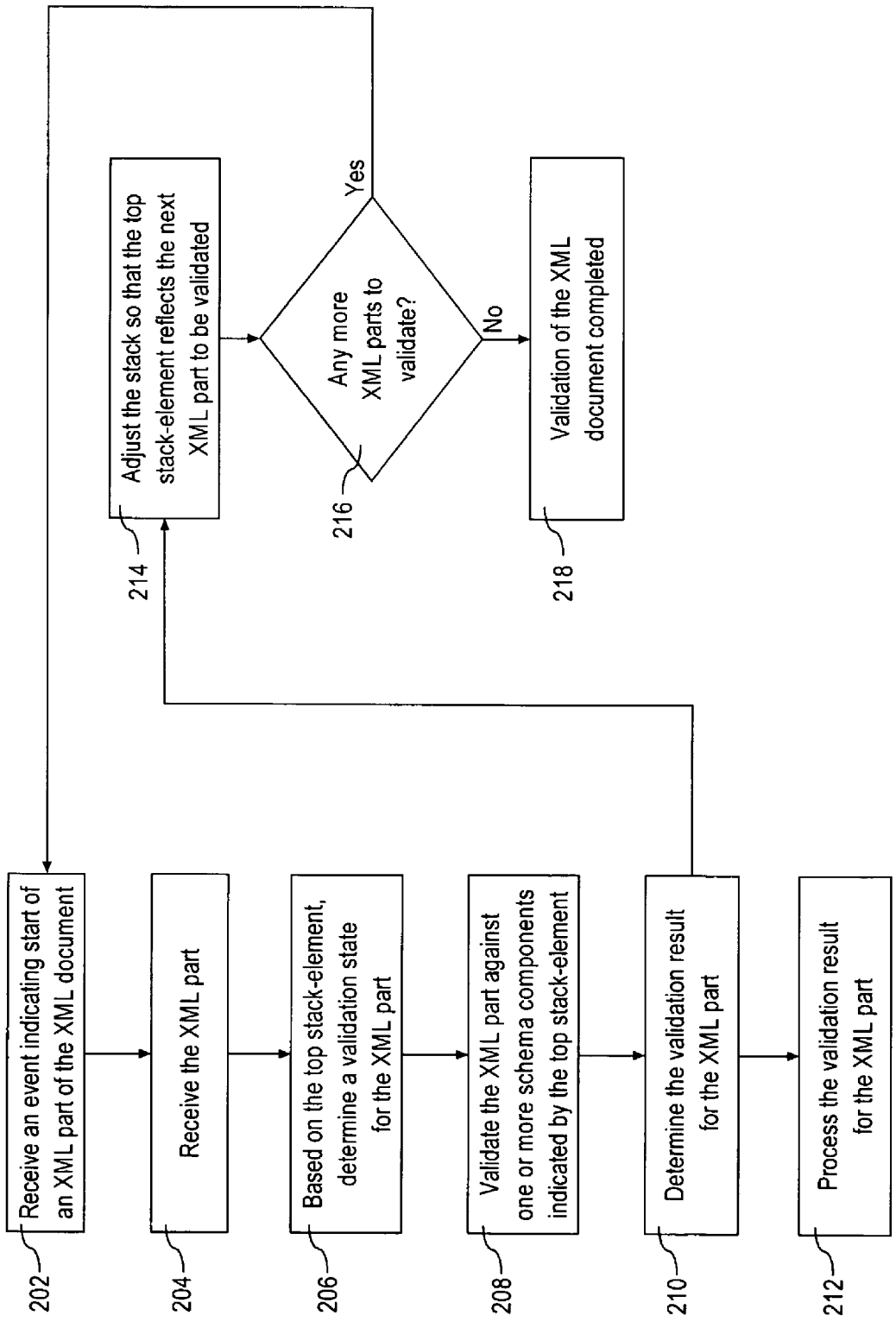
FIG. 2 is a flow diagram that illustrates a high level overview of one embodiment of a method for streaming validation of XML documents.

FIG. 2 is a flow diagram that illustrates a high level overview of one embodiment of a method for streaming validation of XML documents. In this embodiment, the method is implemented by a streaming validator, which may be invoked to validate a particular XML document against a specified XML schema.

In step 202, the streaming validator receives an event, which event indicates the start of an XML part of the XML document being validated. For example, the streaming validator may receive, from a parser that parses the XML document, a start-element event which indicates that the parser has encountered an XML element.

In step 204, the streaming validator receives the XML part from the parser. Receiving the XML part from the parser may include receiving the content of the XML part as well as receiving one or more additional events. For example, if the XML part is an XML element having simple XML type, the streaming validator may receive from the parser a characters event, followed by the content of that XML element as a stream of characters, and followed by an end-element event which indicates that the parsing of that XML element is complete. The content of the XML element may also be an empty content. In the case of an empty content, the streaming validator determines whether the schema defines default values for the content. If the schema defines a default value, then the streaming validator generates the events for that value. For example, if the XML part is an empty XML element and the schema defines a default value of "this is a test", then the streaming validator would receive from the parser a start-element event and an end-element event for the XML element, and would generate characters event for the default value.

In step 206, the streaming validator determines a current validation state for the received XML part based on the top, or current, stack-element that is stored in a stack maintained by the streaming validator. The current validation state indicates the validation type of the received XML part. The top stack-element includes values (e.g. pointers) that reference one or more schema components of the XML schema against which the XML document is being validated. The one or more schema components include the definition of the received XML part.

In step 208, the streaming validator validates the received XML part against the definition of the part included in the one or more schema components that are indicated in the top stack-element. Depending on the validation type of the XML part (as reflected by the current validation state indicated by the top stack-element), the streaming validator may dispatch the XML part for validation to one of its modules that is configured to validate XML parts having that particular validation type. For example, if the received XML part has complex XML type, the streaming validator may dispatch the part to a complex type validator module (e.g. complex type validator 108 in FIG. 1A) for validation. During the process of validation, the module validating the received XML part may store or remove stack-elements from the stack as necessary to track the progress of the validation against the XML schema. After the module completes the validation of the received XML part, the module generates a validation result for that part.

In step 210, the streaming validator determines the validation result for the received XML part. For example, the streaming validator may receive the validation result from the module which completed the validation of that part. In step 212, the streaming validator processes the validation result. For example, if the streaming validator is operating in pipeline mode, the streaming validator may augment the validation result to one or more events (which are associated with the just validated XML part and are received from an events producer that is positioned in front of the streaming validator in the pipeline), and may send these augmented events to an events consumer that is positioned behind the streaming validator in the pipeline. If the streaming validator is operating in standalone mode, the streaming validator may record, or otherwise store, the validation result for the just validated XML part. In addition, regardless of the mode in which it operates, the streaming validator may store the validation result for the received XML part in a log, which is associated with the XML document being validated and includes information indicating the progress of the validation.

After determining the validation result for the XML part in step 210, in step 214 the streaming validator (or any one of its modules) adjusts the stack so that the top stack-element reflects the next XML part that is to be validated. Adjusting the stack may include removing one or more stack-elements from the stack and/or storing one or more stack-elements on the stack. After adjusting the stack is completed, the top stack-element reflects the validation state of the next XML part that is to be received, and includes values which indicate one or more schema components of the XML schema that include the definition of that next XML part.

After the stack is adjusted in step 214, in step 216 the streaming validator determines whether there are any more XML parts of the XML document that need to be validated. For example, based on information stored in the top stack-element, the streaming validator may check the XML schema to determine whether the XML document may include any more XML parts. In another example, in this step the streaming validator may receive one or more events from a parser, which one or more events do not indicate that parts of the XML document that are to be received next need any validation (e.g. comments events). If the streaming validator determines that there are more XML parts to be validated, the streaming validator proceeds with step 202. If the streaming validator determines that there are no more XML parts to validate (e.g. streaming validator receives an end-document event), then the streaming validator proceeds with step 218.

In step 218 the validation of the XML document against the XML schema is completed. In this step, if the streaming validator operates in standalone mode, the streaming validator may generate an overall validation result for the entire XML document based on the stored validation results for each validated XML part of the XML document. The streaming validator may then send the overall validation result to the application which requested the validation of the XML document in the first place.

Validating XML Elements having Simple XML Types

According to the techniques describer herein, simple XML type is a validation type that does not allow an XML element to include any attributes in its opening tag or any sub-elements in its content. The content of an XML element associated with a simple XML type is data that has a built-in or a user-defined datatype, or any derivative datatype thereof. Table 1 below provides one example of an XML element having a simple XML type and the schema components of the XML schema that include the definition of that XML element. The XML Schema definition provided in Table 1 conforms to the XML Schema Specification identified above.

TABLE 1

XML Element of Simple XML Type

| Line | XML Element | Schema Definitions |
|---|---|---|
| 1 | <Price>423.96</Price> | <xsd:element name="Price" type="itemPrice"/> |
| 2 | | <xsd:simpleType name="itemPrice"> |
| 3 | | <xsd:restriction base="xsd:decimal"> |
| 4 | | <xsd:minInclusive value="10.00"/> |
| 5 | | <xsd:maxInclusive value="500.00"/> |
| 6 | | </xsd:restriction> |
| 7 | | </xsd:simpleType> |

The "XML Element" column of Table 1 includes the XML element "Price", which has a content of "423.96". The "Schema Definitions" column of Table 1, in line 1, includes a schema component which indicates that an XML element with name "Price" has the "itemPrice" type. In lines 2-7, the "Schema Definitions" column of Table 1 provides schema components which define the "itemPrice" type as a simple XML type that is a derivative of the "decimal" built-in schema type. In addition, the definition of the "itemPrice" type specifies that content of an XML element having the "itemPrice" type is restricted to a value between "10.00" and "500.00", inclusive.

FIG. 3A is a flow diagram that illustrates one embodiment of a method for validating XML elements associated with simple XML types.

In step 302, a streaming validator implementing the techniques for streaming validation described herein receives an event indicating the start of a part of an XML document, which is being validated against a specified XML schema. For example, with respect to the XML element provided in Table 1, the streaming validator may receive from a parser a start-element event which indicates that the parser has encountered the opening tag of the XML element "Price".

In step 304, the streaming validator determines, based on the current validation state indicated in the top (current) stack-element of the stack, that the part of the XML document that is to be received after the event is an XML element associated with a simple XML type. For example, if the part to be received next from the parser is the XML element provided in Table 1, in this embodiment the streaming validator determines that the top stack-element indicates a "STATE_SIMPLE" validation state.

In step 306, the streaming validator receives the content of the XML element. For example, if the XML element being validated is the XML element provided in Table 1, the streaming validator receives a characters event from the parser, followed by the string "423.96", followed by an end-element event which indicates that the parser has encountered the closing tag of the XML element.

In step 308, the streaming validator validates the received XML element by checking to determine whether the content of the received XML element conforms to the definition that is included in one or more schema components referenced by the top stack-element. For example, if the XML element being validated is the XML element provided in Table 1, in this embodiment the top stack-element includes a pointer to the schema component that defines the XML element (e.g. the schema component in Line 1 of the "Schema Definitions" column of Table 1) as well as pointers to one or more schema components that include additional definitions that may be associated with the XML element definition (e.g. the schema components in Lines 2-7 of the "Schema Definitions" column of Table 1). Thus, when validating the XML element provided in Table 1, the streaming validator (or one of its modules such as simple type validator module 106 in FIG. 1A) would check whether the received string "423.96" represents a proper decimal value, and then would check whether that value conforms to the specified restriction of greater than or equal to "10.00" and less than or equal to "500.00".

After validating the received XML element, the streaming validator adjusts the stack so that the top stack-element would indicate the next part of the XML document that is to be received from the parser.

Validating XML Entities

The XML Schema Specification identified above provides a built-in datatype, "ENTITY", which the techniques described herein consider as simple XML type. An XML element associated with an "ENTITY" datatype includes an entity as its content. An entity is a set of information, for example, some text, in an XML document that is identified by an identifier (e.g. a name) and that can be referenced from different portions of the XML document by its identifier only (instead of copying the entire set of information in the place of the identifier).

According to the techniques described herein, entities are processed in the same way as the content of an XML element associated with simple XML type. Specifically, when a streaming validator implementing the techniques described herein receives a start-entity event from the parser, the streaming validator determines (based on the current validation state indicated in the top stack-element) that it needs to validate an XML part that is associated with simple XML type. After receiving a start-entity event, the streaming validator stores the entity that follows as a stream of bytes in a buffer. When the streaming validator receives an end-entity event, the streaming validator validates the entity against the definition of the entity that is included in one or more schema components that are referenced in the top stack-element.

According to the XML Schema Specification, an entity may be represented in the content of an XML element by a single identifier. In one embodiment implementing the techniques described herein, a parser parsing such XML element would report an entity-reference event when the parser encounters the identifier of the entity in the content of the XML element. Thereafter, the parser would report the entity identifier to the streaming validator. Based on the identifier, the streaming validator would retrieve the text of the entity, would concatenate the text of the entity to the identifier, and would validate the entity as if the entity were the content of an XML element associated with a simple XML type. In another embodiment, instead of reporting the entity-reference event to the streaming validator, the parser would first concatenate the text of the entity to the identifier. Thereafter, the parser would report the entity to the streaming validator by issuing a start-entity event, followed by a characters event for the text of the entity, followed by an end-entity event. The streaming validator would then validate the entity as if the entity were the content of an XML element associated with a simple XML type.

Validating XML Elements having Complex XML Types

According to the techniques described herein, complex XML type is a validation type that allows an XML element to include any number of attributes in its opening tag and/or any number of sub-elements in its content. In an XML schema, a complex XML type is declared by one or more schema components that define one or more attributes and/or the structure of one or more sub-elements that may be included in the content of an XML element of the complex XML type. Table 2A below provides one example of an XML element having a complex XML type. Table 2B below provides the schema components of the XML schema that include the definition of that XML element.

TABLE 2A

XML Element of Complex XML Type

| Line | XML Element |
|---|---|
| 1 | <shipTo country="US"> |
| 2 |   <name>John Smith</name> |
| 3 |   <street>123 Market Street</street> |
| 4 |   <city>San Jose</city> |
| 5 |   <state>CA</state> |
| 6 |   <zip>95112</zip> |
| 7 | </shipTo> |

TABLE 2B

Schema Definition of the XML Element of Table 2A

| Line | Schema Definitions |
|---|---|
| 1 | <xsd:element name="shipTo" type="USAddress" minOccurs="1"/> |
| 2 | <xsd:complexType name="USAddress"> |
| 3 |   <xsd:sequence> |
| 4 |     <xsd:element name="name" type="xsd:string"/> |
| 5 |     <xsd:element name="street" type="xsd:string"/> |
| 6 |     <xsd:element name="city" type="xsd:string"/> |
| 7 |     <xsd:element name="state" type="xsd:string"/> |
| 8 |     <xsd:element name="zip" type="xsd:decimal"/> |
| 9 |   </xsd:sequence> |
| 10 |   <xsd:attribute name="country" type="string"/> |
| 11 | </complexType> |

The "shipTo" XML element provided in Table 2A includes the attribute "country" with a value of "US". The "shipTo" XML element also includes the sub-elements "name", "street", "city", "state", and "zip", which include the contents "John Smith", "123 Market Street", "San Jose", "Calif.", and "95112", respectively. Line 1 of Table 2B, includes a schema component which indicates that an XML element with name "shipTo" has the "USAddress" type and, as indicated by the "minOcucrs" attribute, must occur in its parent XML element at least once. Lines 2-11 of Table 2B provide the schema components that define the "USAddress" type. Specifically, Line 2 defines the "USAddress" type as complex XML type. Line 3 defines that an XML element of "USAddress" type must include a sequence of XML sub-elements as a SEQUENCE content particle, and Lines 4-8 define these XML sub-elements as "name", "street", "city", "state", and "zip". Line 10 defines that an XML element of "USAddress" type may also include an attribute named "country", the value of which has a datatype of "string".

Figure 3B:
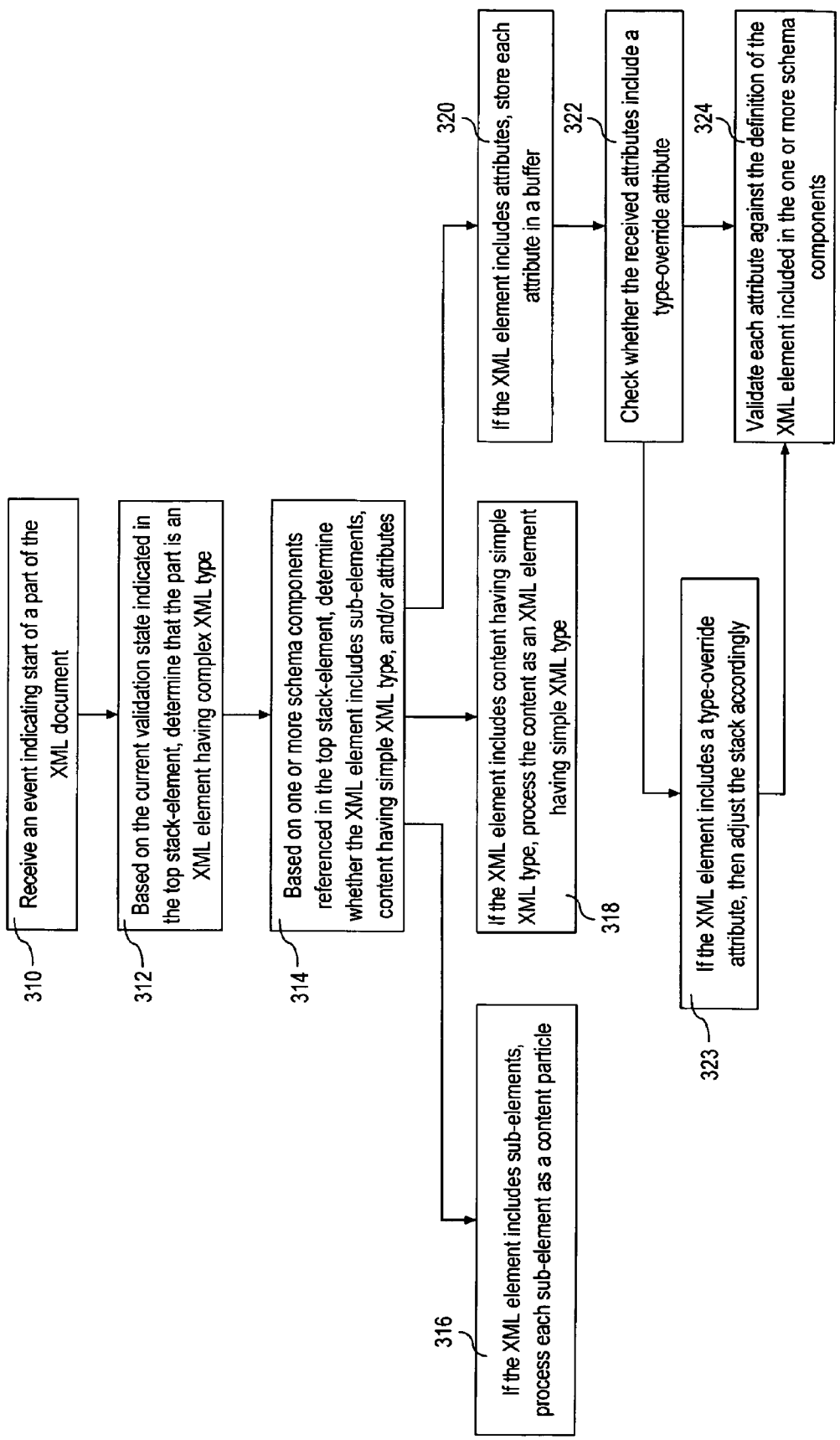
FIG. 3B is a flow diagram that illustrates one embodiment of a method for validating XML elements associated with complex XML types.

FIG. 3B is a flow diagram that illustrates one embodiment of a method for validating XML elements associated with complex XML types.

In step 310, a streaming validator implementing the techniques for streaming validation described herein receives an event indicating the start of a part of an XML document, which is being validated against a specified XML schema. For example, with respect to the XML element provided in Table 2A, the streaming validator may receive from a parser a start-element event which indicates that the parser has encountered the opening tag of the XML element "shipTo".

In step 312, the streaming validator determines, based on the current validation state indicated in the top (current) stack-element of the stack, that the part of the XML document that is to be received after the event is an XML element associated with a complex XML type. For example, if the part to be received next from the parser is the XML element provided in Table 2A, in this embodiment the streaming validator determines that the top stack-element indicates a "STATE_COMPLEX" validation state.

After determining that the XML element to be received next is associated with the "STATE_COMPLEX" validation state, the streaming validator passes control to one of its modules that is configured for validating XML elements of complex XML types (such as, for example, complex type validator 108 in FIG. 1A). The stack-element including the "STATE_COMPLEX" validation state would have been set on the top of the stack when the validation of the previous part of the XML document had been completed. Based on the schema components referenced in the top (current) stack element, in step 314 the complex type validator module of the streaming validator determines, based on one or more schema components that are referenced by pointers stored in the top stack-element, whether the XML element to be received next includes content having complex XML type, content having simple XML type, and/or any attributes. If it is determined that the XML element to be validated includes any attributes, then the complex type validator module processes these attributes first as indicated in steps 320 to 324. If it is determined that the XML element to be validated includes content having simple XML type, then the complex type validator changes the validation state reflected in the top stack-element to indicate a "STATE_SIMPLE" state.

If in step 314 it is determined that the XML element to be validated includes content having complex XML type, the complex type validator module checks the XML schema (based on pointers to the one or more schema components that are stored in the top stack-element) and determines the validation type of the part, or sub-element, of the XML element that is to be received next. In addition, when the schema definition of the XML element was fetched and the pointers to the one or more schema components were set in the top stack-element, any "xsi:type" values in the schema definition and any substitution groups were taken into consideration. The complex type validator module then creates and stores on the stack, as the top (current) element, one or more new stack-elements that indicate the validation state of the part, or sub-element, of the XML element to be received next and that include values (e.g. pointers) referencing the schema components which include the definition of that sub-element. For example, with respect to the XML element provided in Table 2A, the module determines that the next sub-element to be received from the parser is of a SEQUENCE particle type; thus, the module creates and stores on top of the stack a new stack-element which indicates the "STATE_SEQUENCE" validation state and stores pointers to the schema components provided in Lines 3-9 of Table 2B.

Thereafter, in step 316 each sub-element of the XML element that is subsequently received from the parser is validated as a content particle. In some embodiments, this step may be performed by a module of the streaming validator that is configured to process XML elements having content particle types (such as, for example, content particle validator 110 in FIG. 1A). In these embodiments, the complex type validator module of the streaming validator may be configured to call, and pass parameters to, the content particle validator module of the streaming validator.

The mechanisms for validating each type of content particle are provided in a separate section hereinafter. After each sub-element is validated, the streaming validator and/or one of its modules adjusts the stack to reflect the validation state and schema components associated with the next sub-element that is to be validated by storing and/or removing stack-elements from the stack as necessary.

Validating Complex XML Elements with Simple XML Type Content

Referring to FIG. 3B, if in step 314 it is determined that the XML element (which is of complex XML type) to be validated does not include sub-elements, then the complex type validator module determines that the XML element includes content of simple XML type. (An example of such XML element is an XML element that includes attributes in its opening tag, but does not include any sub-elements.)

According to the techniques described herein, an XML element associated with complex XML type that includes content of simple XML type is processed in the same way as an XML element associated with simple XML type. Specifically, the complex type validator module of the streaming validator checks the XML schema (based on pointers to the one or more schema components that are stored in the top stack-element) and determines that the XML element that is to be received next does not include any sub-elements. The complex type validator module then creates and stores on the stack, as the top (current) element, a new stack-element that indicates the "STATE_SIMPLE" validation state of the content to be received next and that includes values (e.g. pointers) referencing the schema components which include the definition of that content.

In step 318, the XML element which includes content of simple XML type is processed. Specifically, the content of the XML element is received from the parser and is validated against the definition included in the one or more schema components pointed to by values stored in the top (current) stack element. In some embodiments, this step may be performed by a module of the streaming validator that is configured to process XML elements having simple XML types (such as, for example, simple type validator 106 in FIG. 1A). In these embodiments, the complex type validator module of the streaming validator may be configured to call, and pass parameters to, the simple type validator module of the streaming validator.

After the content of the XML element is validated, the streaming validator and/or one if its modules adjust the stack to reflect the validation state and schema components associated with the next XML element that is to be validated by storing and/or removing stack-elements from the stack as necessary.

Validating XML Element Attributes

Referring to FIG. 3B, if in step 314 it is determined that the XML element (which is of complex XML type) to be validated includes one or more attributes, then in step 320 the streaming validator receives each attribute from the parser and stores each attribute in a buffer, which is accessible by the complex type validator module.

In one embodiment that uses a StAX parser, the parser does not generate separate events for each attribute it encounters. Instead, after the parser encounters and reports the opening tag of the XML element in a start-element event to the streaming validator, the streaming validator requests information from the parser regarding the number of the attributes included in the XML element. Thereafter, the streaming validator requests each attribute from the parser, and stores each attribute in a buffer. In other embodiments, XML parsers that generate separate events for each encountered attribute may be used. In these embodiments, the streaming validator receives and stores each attribute in a similar fashion.

In step 322, the complex type validator module of the streaming validator checks each attribute stored in the buffer to determine whether the received attributes include a type-override attribute. A type-override attribute is an attribute that changes the type of the XML element. For example, the value of a type-override attribute may specify that the particular XML element is associated with a different XML type than the type of the XML element that is originally specified in the definition of the XML element in the XML schema. The override XML type may be defined or declared in the same or in a different XML schema.

If in step 322 it is determined that the set of received attributes does not include a type-override attribute, then in step 324 the complex type validator module of the streaming validator validates each attribute against the definition of the XML element included in one or more schema components that are referenced in the top stack-element.

If in step 322 it is determined that the set of received attributes includes a type-override attribute, then in step 323 the complex type validator module of the streaming validator adjusts the stack to reflect the new validation state that is associated with the override XML type specified in the type-override attribute. For example, the complex type validator module may modify the top (current) stack-element to reflect the new validation state associated with the new type of the XML element and/or to include one or more values that reference one or more schema components that include the new definition of the XML element. In another example, the complex type validator module may remove one or more stack-elements from the stack and/or create and store on the stack one or more new stack-elements. The new stack-elements reflect the new validation state associated with the XML element, and may also include values (e.g. pointers) referencing one or more schema components that include the new definition of the XML element. Thereafter, in step 324 the complex type validator module validates each attribute against the definition of the XML element included in one or more schema components that are referenced in the top stack-element.

Validating XML Elements having Content Particle Types

According to the techniques described herein, a content particle type is a validation type of a content particle that is an XML document part included in the content of an XML element. In an XML schema, a content particle is defined by one or more content particle schema components; according to the XML Schema Specification, examples of content particle schema components include, but are not limited to, "choice" schema components, "sequence" schema components, "all" schema components, "group" schema components, and wildcard, or "any", schema components.

Figure 3C:
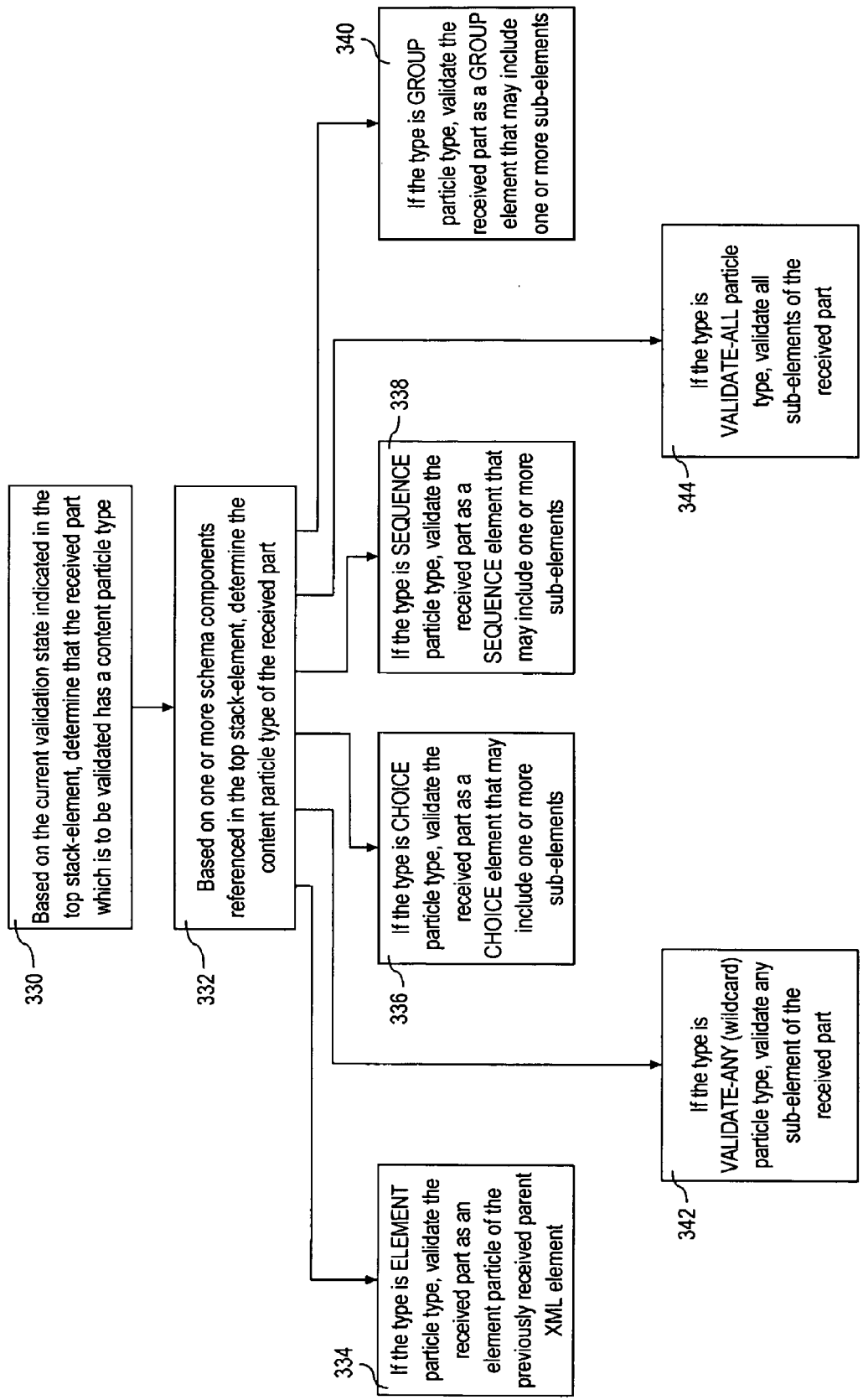
FIG. 3C is a flow diagram that illustrates one embodiment of a method for validating XML elements associated with content particle types.

FIG. 3C is a flow diagram that illustrates one embodiment of a method for validating XML elements associated with content particle types.

In this embodiment, in step 330 a content particle validator module of the streaming validator determines, based on the current validation state indicated in the top (current) stack-element of the stack, that the part of the XML document that is to be received next is an XML element associated with a content particle type. (An example of a content particle validator module, which is configured to validate XML elements of content particle types, is content particle validator 110 in FIG. 1A.) According to the techniques described herein, depending on the validation type of the content particle to be received, the current validation state can be any one of "STATE_ELEMENT", "STATE_SEQUENCE", "STATE_CHOICE", "STATE_GROUP", "STATE_ALL", and "STATE_ANY". In this embodiment, the content particle validator module may be invoked to perform this step by a complex type validator module of the streaming validator.

In step 332, based on the current validation state and/or on the one or more schema components referenced in the top stack-element, the content particle validator determines the content particle type of the content particle of the parent XML element that is to be received next.

If in step 332 it is determined that the content particle type is "ELEMENT" particle type, then the content particle that is to be received next is a part, or sub-element, of the parent XML element, and in step 334 the content particle validator module validates that part accordingly. If in step 332 it is determined that the content particle type is "CHOICE" particle type, then the content particle that is to be received next is a choice content particle that may include one or more parts, or sub-elements, and in step 336 the content particle validator module validates that content particle accordingly. If in step 332 it is determined that the content particle type is "SEQUENCE" particle type, then the content particle that is to be received next is a sequence content particle that may include one or more parts, or sub-elements, and in step 338 the content particle validator module validates that content particle accordingly. If in step 332 it is determined that the content particle type is "GROUP" particle type, then the content particle that is to be received next is a group content particle that may include one or more parts, or sub-elements, and in step 340 the content particle validator module validates that content particle accordingly. If in step 332 it is determined that the content particle type is "VALIDATE-ANY" particle type, then the content particle that is to be received next may include one or more parts, or sub-elements, any one of which may be validated in order for the content particle to be valid, and in step 342 the content particle validator module validates that content particle accordingly. If in step 332 it is determined that the content particle type is "VALIDATE-ALL" particle type, then the content particle that is to be received next is a content particle that may include one or more parts, or sub-elements, all of which need to be validated, and in step 344 the content particle validator module validates that content particle accordingly.

If a content particle type includes sub-elements, during the process of validating each sub-element, the content particle validator module of the streaming validator may store stack-elements on the stack or remove stack-elements from the stack as necessary to reflect the sub-element that is going to be received next from the parser. After the content particle and each of its sub-elements (if any) is validated, the streaming validator and/or one of its modules (such as, for example, the content particle validator module) adjusts the stack to reflect the validation state and schema components associated with the part of the XML document that is to be validated next by storing and/or removing stack-elements from the stack as necessary.

Validating Element Content Particles

As referred to herein, a content particle of "ELEMENT" content particle type is an XML element that is a part, or sub-element, of a parent XML element. A stack-element that represents on the stack a content particle of the "ELEMENT" content particle type indicates a validation state of "STATE_ELEMENT" and includes one or more values (e.g. pointers) that reference one or more schema components that include the definition of the content particle. In addition, the stack-element also stores an occurrence count, the value of which indicates the number of times the content particle occurs in its parent XML element.

When the content particle validator module of the streaming validator receives from the parser the element content particle being validated, the content particle validator module attempts to match the element content particle to the definition included in the one or more schema components referenced in the top stack-element. If a match occurs, the content particle validator module sets up this element content particle as the next XML element to be validated. This includes fetching the correct validation type for this XML element from the one or more schema components and storing a new stack-element on top of the stack, where the new stack-element is set to reflect a validation state of "STATE_COMPLEX" or "STATE_SIMPLE" and its schema component pointers are adjusted to reference the schema components that define the XML element to be validated next. If there is no match, an error may be generated based on the value of the "minOccurs" attribute included in the one or more schema components. However, depending on the validation type of the content of the content particle, this error may be ignored by the streaming validator module that called the content particle validator module. For example, suppose that an XML element of a complex XML type is defined as follows:

```
<xs:complexType>
  <xs:choice>
    <xs:element name="FirstName"/>
    <xs:element name="LastName"/>
  </xs:choice>
</xs:complexType>
```

If the content particle validator module is called to validate the element content particle "LastName", the content particle validator module will encounter an error when trying to match this content particle against the "FirstName" schema component that is listed first in the definition. However, because the content particle being validated is included as a "choice" content particle, the content particle validator module will ignore the error and will proceed to match the content particle against the second schema component in the definition.

Thereafter, the content particle validator module proceeds with validating each part, or sub-element, of the element content particle based on the validation state and the schema components reflected in the top stack-element. (Depending on the structure of the parent XML element), and a "maxOccurs" attribute (which indicates the maximum number of times the content particle may occur in its parent XML element). The content of a choice content particle may be a particular sub-element that is a choice in the alternative from one or more sub-elements that are declared in the definition of the choice content particle, where the particular sub-element may occur a varying number of times and may itself be a content particle of an "ELEMENT" content particle type, a "GROUP" content particle type, a "CHOICE" content particle type, "SEQUENCE" content particle type, or a "VALIDATE-ANY" content particle type. For example, if the definition of a choice content particle specifies that the content particle may include any one of the sub-elements "AA", "BB", "CC", and "DD", then a choice content particle would be considered valid when its content includes one valid sub-element from among sub-elements "AA", "BB", "CC", and "DD".

A stack-element that represents on the stack a content particle of the "CHOICE" content particle type indicates a validation state of "STATE_CHOICE" and includes one or more values (e.g. pointers) that reference one or more schema components that include the definition of the content particle. The stack-element representing a choice content particle type also stores an occurrence count, the value of which indicates the number of times the received content particle occurs in its parent XML element. In addition, the stack-element representing a choice content particle type also stores a reference (e.g. a pointer) to a list of entries that is stored in volatile memory or in other computer-readable medium, where each entry on the list includes information representing a sub-element, or part, of the choice content particle.

When the content particle validator module of the streaming validator receives from the parser a particular sub-element of the choice content particle being validated, the content particle validator module checks to determine whether the received sub-element is the first sub-element of a new occurrence of sub-elements. If the received sub-element is the first sub-element of a new occurrence of sub-elements, the content particle validator module creates an entry representing the received sub-element and inserts that entry at the head of the list of entries pointed to by the list reference pointer stored in the top stack-element.

The content particle validator module attempts to match a received sub-element of the choice content particle against the definition of that sub-element included in the one or more schema components referenced in the top stack-element. If a match is found, the content particle validator module proceeds with validating the content of the sub-element against the schema definition. If a match is not found, the content particle validator continues with validating the next sub-element of the choice content particle. In order to be valid, a choice content particle needs a match for one sub-element for each occurrence of sub-elements indicated in the list of entries. After processing each sub-element of the choice content particle, the content particle validator module returns control to the main validation driver of the streaming validator. The main validation driver then calls the content particle validator module again for the next sub-element of the choice content particle. (Depending on the structure of each particular sub-element, the process of validating the content of each sub-element may include one or more, and possibly recursive, calls to one or more validator modules of the streaming validator, such as, for example, the simple type validator module, the complex type validator module, and the content particle validator module.)

When the last sub-element of the choice content particle is processed in this manner, the occurrence count stored in the stack-element representing the choice content particle is incremented and is checked against the "minOccurs" and "maxOccurs" attribute values specified in the one or more schema components for the content particle. With this the validation of the choice content particle is completed. The content particle validator generates a validation result for the choice content particle. If the choice content particle received from the parser includes a match for one sub-element of each occurrence of sub-elements and if the occurrence count for the choice content particle conforms to the restrictions specified in the "minOccurs" and "maxOccurs" attribute values, then the content particle validator module generates a validation result indicating a successful validation; otherwise, a validation result indicating a failure is generated.

After generating the validation result for the choice content particle, the content particle validator module adjusts the stack by removing the top stack-element and/or storing one or more stack-elements that reflect the next part of the XML document that is to be validated.

Validating Sequence Content Particles

A content particle of "SEQUENCE" content particle type is an XML element that may include one or more sub-elements. An example of a definition of a sequence content particle according to the XML Schema Specification is provided in the schema component below:

```
<sequence
    id = ID
    maxOccurs = (nonNegativeInteger | unbounded) : 1
    minOccurs = nonNegativeInteger : 1
    {any attributes with non-schema namespace . . .}>
    Content: (annotation?, (element | group | choice | sequence | any)*)
</sequence>
```

As shown in the above example, the definition of a sequence content particle may include a set of attributes including, but not limited to, an identifier attribute, a "minOccurs" attribute (which indicates the minimum number of times the content particle may occur in its parent XML element), and a "maxOccurs" attribute (which indicates the maximum number of times the content particle may occur in its parent XML element). The content of a sequence content particle may be a sequence of one or more sub-elements that are declared in the definition of the sequence content particle, where each of the sub-elements may occur a varying number of times and may itself be a content particle of an "ELEMENT" content particle type, a "GROUP" content particle type, a "CHOICE" content particle type, "SEQUENCE" content particle type, or a "VALIDATE-ANY" content particle type. However, in order for a sequence content particle to be valid, all sub-elements (regardless of their individual occurrence counts) in the sequence must match the order in which they are declared in the schema definition. For example, if the definition of a sequence content particle specifies the sequence of sub-elements "AA", "BB", "CC", and "DD", then in order for a sequence content particle to be valid the content particle must include these sub-elements in that order.

A stack-element that represents on the stack a content particle of the "SEQUENCE" content particle type indicates a validation state of "STATE_SEQUENCE" and includes one or more values (e.g. pointers) that reference one or more schema components that include the definition of the content particle. The stack-element representing a sequence content particle type also stores an occurrence count, the value of which indicates the number of times a received content particle occurs in its parent XML element. In addition, the stack-element representing a sequence content particle type also stores a reference (e.g. a pointer) to a list of entries that is stored in volatile memory or in other computer-readable medium, where each entry on the list includes information representing a sub-element of the sequence content particle.

When the content particle validator module of the streaming validator receives from the parser a particular sub-element of the sequence content particle being validated, the content particle validator module checks to determine whether the received sub-element is content particle, the process of validating the parts of the element content particle may include one or more, and possibly recursive, calls to one or more validator modules of the streaming validator, such as, for example, the simple type validator module, the complex type validator module, and the content particle validator module.) If the validation of the parts of the element content particle succeeds, the content particle validator module increments the occurrence count stored in the top stack-element, generates a validation result indicating a successful validation, reports the validation result, and proceeds to process the next part of XML document. Otherwise, the content particle validator module generates a validation result indicating a failed validation. After the validation of the parts of the element content particle is completed, the content particle validator module adjusts the stack by removing one or more stack-elements from the stack. In addition, the content particle validator module may also generate and/or log the validation result.

Validating Choice Content Particles

A content particle of "CHOICE" content particle type is an XML element that may include one or more parts, or sub-elements. An example of a definition of a choice content particle according to the XML Schema Specification is provided in the schema component below:

```
<choice
    id = ID
    maxOccurs = (nonNegativeInteger | unbounded) : 1
    minOccurs = nonNegativeInteger : 1
    {any attributes with non-schema namespace . . .}>
    Content: (annotation?, (element | group | choice | sequence | any)*)
</choice>
```

As shown in the above example, the definition of a choice content particle may include a set of attributes including, but not limited to, an identifier attribute, a "minOccurs" attribute (which indicates the minimum number of times the content particle may occur in its the first sub-element of a new occurrence of sub-elements. If the received sub-element is the first sub-element of a new occurrence, then the content particle validator module creates an entry representing the received sub-element and inserts that entry at the head of the list of entries pointed to by the list reference stored in the top stack-element.

The content particle validator module attempts to match the received sub-element against the definition of that sub-element included in the one or more schema components referenced in the top stack-element. If the received sub-element matches the definition, then the content particle validator module proceeds to validate the content of the received sub-element. (Depending on the structure of the received sub-element, the process of validating the content of the sub-element may include one or more, and possibly recursive, calls to one or more validator modules of the streaming validator, such as, for example, the simple type validator module, the complex type validator module, and the content particle validator module.) If the validation of the content of the received sub-element succeeds, then the content particle validator module increments the occurrence count stored in the top stack-element.

After processing each sub-element of the sequence content particle, the content particle validator module returns control to the main validation driver of the streaming validator. The main validation driver then calls the content particle validator module again for the next sub-element of the sequence content particle. The content particle validator module then proceeds to receive and process the next sub-element (and its possibly multiple occurrences) of the sequence content particle being validated according to the same steps outlined above. When the last sub-element of the sequence content particle is processed in this manner, the occurrence count stored in the stack-element representing the sequence content particle is checked against the "minOccurs" and "maxOccurs" attribute values specified in the one or more schema components for the content particle. With this the validation of the sequence content particle is completed. If all sub-elements of the sequence content particle (and their multiple occurrences, if any) are matched and conform to the order specified in the schema definition for the sequence content particle, and if the occurrence count for the sequence content particle stored in the top stack-element conforms to the restrictions specified by the values of the "minOccurs" and "maxOccurs" attributes in the schema definition, then the content particle validator module generates a validation result indicating a successful validation. Otherwise, the content particle validator module generates a validation result indicating a failed validation.

After completing the validation and generating the validation result for the sequence content particle, the content particle validator module adjusts the stack by removing the top stack-element and/or storing one or more stack-elements that reflect the next part of the XML document that is to be validated.

Validating Validate-All Content Particles

A content particle of "VALIDATE-ALL" content particle type is an XML element that may include one or more sub-elements. An example of a definition of a validate-all content particle according to the XML Schema Specification is provided in the schema component below:

```
<all
    id = ID
    maxOccurs = 1 : 1
    minOccurs = (0 | 1) : 1
    {any attributes with non-schema namespace . . .}>
    Content: (annotation?, element)*)
</all>
```

As shown in the above example, the definition of a validate-all content particle may include a set of attributes including, but not limited to, an identifier attribute, a "minOccurs" attribute (which in the above example indicates that the content particle may occur exactly zero or once in its parent XML element), and a "maxOccurs" attribute (which in the above example indicates that the content particle may occur maximum once in its parent XML element). The content of a validate-all content particle may include one or more sub-elements of "ELEMENT" content particle type in any order. Thus, in order to be valid, all sub-elements of a validate-all content particle must be valid regardless of the order in which they appear in the content particle.

A stack-element that represents on the stack a content particle of the "VALIDATE-ALL" content particle type indicates a validation state of "STATE_ALL" and includes one or more values (e.g. pointers) that reference one or more schema components that include the definition of the content particle. The stack-element representing a validate-all content particle type also stores an occurrence count, the value of which indicates the number of times a received content particle occurs in its parent XML element. In addition, the stack-element representing a validate-all content particle type also stores a reference (e.g. a pointer) to a list of entries that is stored in volatile memory or in other computer-readable medium, where each entry on the list includes information representing a sub-element of the validate-all content particle.

In order to process a validate-all content particle, the content particle validator module first receives each sub-element of the validate-all content particle. For each received sub-element, the content particle validator module creates an entry representing the received sub-element and inserts that entry in the list of entries pointed to by the list reference stored in the top stack-element. In addition, for each entry in the list, the content particle validator module initializes a counter associated with that entry to zero.

Thereafter, based on the definition of the validate-all content particle included in the one or more schema components pointed to by the top stack-element, the content particle validator module loops through the list of entries and attempts to match each sub-element represented in the list against the definition of the validate-all content particle. If a match is found, the counter associated with the particular entry is incremented and the content particle validator module proceeds to validate the content of the sub-element associated with that entry. If the content of the sub-element conforms to the definition of the sub-element, then the content particle validator module increments the occurrence count stored in the top stack-element. After processing each sub-element of the validate-any content particle, the content particle validator module returns control to the main validation driver of the streaming validator. The main validation driver then calls the content particle validator module again for the next sub-element of the validate-all content particle. The content particle validator module then proceeds to receive and process the next sub-element (and its possibly multiple occurrences) of the validate-all content particle being validated according to the same steps outlined above.

When the last sub-element of the validate-all content particle is processed in this manner, the occurrence count stored in the stack-element representing the validate-all content particle is checked against the "minOccurs" and "maxOccurs" attribute values specified in the one or more schema components for the content particle. With this the validation of the validate-all content particle is completed. If all sub-elements of the validate-all content particle are matched regardless of their order and are validated successfully, and if the occurrence count for the validate-all content particle stored in the top stack-element conforms to the restrictions specified by the values of the "minOccurs" and "maxOccurs" attributes in the schema definition of the content particle, then the content particle validator module generates a validation result indicating a successful validation. Otherwise, the content particle validator module generates a validation result indicating a failed validation.

After completing the validation and generating the validation result for the validate-all content particle, the content particle validator module adjusts the stack by removing the top stack-element and/or storing one or more stack-elements that reflect the next part of the XML document that is to be validated.

Validating Group Content Particles

A content particle of "GROUP" content particle type is an XML element that may include one or more sub-elements. An example of a definition of a group content particle according to the XML Schema Specification is provided in the schema component below:

```
<group
    id = ID
    maxOccurs = (nonNegativeInteger | unbounded) : 1
    minOccurs = nonNegativeInteger : 1
    name = NCName
    ref = QName
```

-continued

```
{any attributes with non-schema namespace ...}>
Content: (annotation?, (all | choice | sequence | any)?)
</group>
```

As shown in the above example, the definition of a group content particle may include a set of attributes including, but not limited to, an identifier attribute, a "minOccurs" attribute (which indicates the minimum number of times the content particle may occur in its parent XML element), and a "maxOccurs" attribute (which indicates the maximum number of times the content particle may occur in its parent XML element). The definition of a group content particle may also include a "name" attribute, which specifies a name for the group element, and a "ref" attribute, which may include an XML Qualified Name that references the schema definition of the group content particle. The content of a group content particle may be a set of one or more sub-elements that are declared in the definition of the group content particle, where the set of sub-elements is referenced by name in the XML document and the sub-elements in the set always appear together in the XML document. Each of the sub-elements of a group content particle may itself be a content particle of a "VALIDATE-ALL" content particle type, a "CHOICE" content particle type, or a "SEQUENCE" content particle type. In order for a group content particle to be valid, all sub-elements (regardless of their individual occurrence counts) in the group must be valid.

A stack-element that represents on the stack a content particle of the "GROUP" content particle type indicates a validation state of "STATE_GROUP" and includes a value (e.g. a pointer) that reference a schema component that includes the definition of the content particle. The stack-element representing a group content particle type also stores an occurrence count, the value of which indicates the number of times a received content particle occurs in its parent XML element. In addition, the stack-element representing a group content particle type also stores a reference (e.g. a pointer) to a list of entries that is stored in volatile memory or in other computer-readable medium, where each entry on the list includes information representing a sub-element of the group content particle.

In order to process a group content particle, the content particle validator module receives each sub-element of the group content particle. For each received sub-element, the content particle validator module creates an entry representing the received sub-element and inserts that entry in the list of entries pointed to by the list reference stored in the top stack-element.

Thereafter, based on the value of the "ref" attribute in the definition of the group content particle included in the schema component pointed to by the top stack-element, the content particle validator module identifies one or more schema components that include the definitions of each sub-element included in the group content particle. The content particle validator module then loops through the list of entries and attempts to validate each sub-element represented in the list against its corresponding definition. Depending on the structure of a received sub-element, the process of validating the content of the sub-element may include one or more, and possibly recursive, calls to the content particle validator module. After processing each sub-element of the group content particle, the content particle validator module returns control to the main validation driver of the streaming validator. The main validation driver then calls the content particle validator module again for the next sub-element of the group content particle. The content particle validator module then proceeds to receive and process the next sub-element (and its possibly multiple occurrences) of the sequence content particle being validated according to the same steps outlined above. If all sub-elements of the group content particle are successfully validated, then the content particle validator module increments the occurrence count stored in the top stack-element, and proceeds to process another occurrence of the group content particle, if any.

When the last sub-element of the group content particle is processed in this manner, the occurrence count stored in the stack-element representing the group content particle is checked against the "minOccurs" and "maxOccurs" attribute values specified in the one or more schema components for the content particle. With this the validation of the group content particle is completed. If all sub-elements of the group content particle are matched against the schema definition and are validated successfully, and if the occurrence count for the group content particle stored in the top stack-element conforms to the restrictions specified by the values of the "minOccurs" and "maxOccurs" attributes in the schema definition of the group content particle, then the content particle validator module generates a validation result indicating a successful validation. Otherwise, the content particle validator module generates a validation result indicating a failed validation.

After completing the validation and generating the validation result for the group content particle, the content particle validator module adjusts the stack by removing the top stack-element and/or storing one or more stack-elements that reflect the next part of the XML document that is to be validated.

Validating Validate-Any (Wildcard) Content Particles

A content particle of "VALDIATE-ANY" content particle type is an XML element that is a sub-element of a parent XML element. An example of a definition of a validate-any content particle according to the XML Schema Specification is provided in the schema component below:

```
<any
    id = ID
    maxOccurs = (nonNegativeInteger | unbounded) : 1
    minOccurs = nonNegativeInteger : 1
    namespace = ((##any | ##other) | List of (anyURI |
        (##targetNamespace | ##local)) ) : ##any
    processContents = (lax | skip | strict) : strict
    {any attributes with non-schema namespace ...}>
    Content: (annotation?)
</any>
```

As shown in the above example, the definition of a validate-any content particle may include a set of attributes including, but not limited to, an identifier attribute, a "minOccurs" attribute (which indicates the minimum number of times the content particle may occur in its parent XML element), and a "maxOccurs" attribute (which indicates the maximum number of times the content particle may occur in its parent XML element). The definition of a validate-any content particle may also include a "namespace" attribute that specifies a namespace that includes the definition of the validate-any content particle. In addition, the definition of the validate-any content particle may also include a "processContents" attribute, the value of which specifies the type of validation that needs to be performed on the validate-any content particle. For example, a value of "strict" indicates that the content particle must be validated, a value of "lax" means the content particle needs to be validated if possible, and a value of "skip" means that the validation of the content particle must be skipped. If the validation of a validate-any content particle is to be skipped (e.g. if the value of the "processContents" attribute is "skip" or if the content particle definition does not exist in "lax" validation mode), then the streaming validator skips all events corresponding to this content particle and its sub-elements. Once the end-element event for this validate-any content particle is encountered, the "skip" or "lax" validation instruction is no longer in effect for the XML elements that follow. In order to be valid, the validate-any content particle needs to match any XML element definition that is indicated by the value of the "namespace" attribute included in the schema definition for the validate-any content particle.

A stack-element that represents on the stack a content particle of the "VALIDATE-ANY" content particle type indicates a validation state of "STATE_ANY" and includes one or more values (e.g. pointers) that reference one or more schema components that include the definition of the content particle. The stack-element representing a validate-any content particle type also stores an occurrence count, the value of which indicates the number of times a received content particle occurs in its parent XML element.

In order to process a validate-any content particle, the content particle validator module first receives the content of the validate-any content particle. Thereafter, based on the value of the "namespace" attribute in the definition of the validate-any content particle, the content particle validator module identifies one or more schema components that include the definition of the validate-any content particle. The content particle validator module then attempts to validate the validate-any content particle against the definition included in the one or more schema components. The type of validation performed is governed by the value of the "processContents" attribute stored in the definition of the validate-any content particle. In case of "processContents=skip", a flag is set to indicate the start of the validate-any content particle. In this way, the streaming validator can skip the validation of the validate-any content particle and all of its sub-elements (for example, by not calling the content particle validator module at all) until the streaming validator receives from the parser the end-element event for this validate-any content particle.

If the content of the validate-any content particle is successfully validated, then the content particle validator module increments the occurrence count stored in the top stack-element, and proceeds to process another occurrence of the validate-any content particle, if any. The validation for a validate-any content particle is complete when all occurrences of the validate-any content particle are processed in the above manner. If all occurrences are validated successfully, and if the occurrence count for the validate-any content particle stored in the top stack-element conforms to the restrictions specified by the values of the "minOccurs" and "maxOccurs" attributes in the schema definition of the validate-any content particle, then the content particle validator module generates a validation result indicating a successful validation. Otherwise, the content particle validator module generates a validation result indicating a failed validation.

After completing the validation and generating the validation result for the validate-any content particle, the content particle validator module adjusts the stack by removing the top stack-element and/or storing one or more stack-elements that reflect the next part of the XML document that is to be validated.

Validating Content Particles by using DFA-Based Mechanisms

Instead of using a stack-based validation state machine, some embodiments of the techniques for streaming validation of XML documents described herein may use Deterministic Finite Automata (DFA) mechanisms to validate content particles. Generally, a DFA mechanism provides a finite state machine that is capable of handling any validation state changes that may occur when validating nested content particles, such as, for example, nested sequence and/or choice content particles.

In these embodiments, in order to validate a set of content particles included in a parent XML element, a Non-deterministic Finite Automata (NFA) graph is first build based on the content particle definitions included in the XML schema against which the parent XML element is being validated. Thereafter, the NFA graph is converted into a DFA graph by using a standard NFA-to-DFA algorithm. Once the DFA graph is generated, the set of all content particles included in the parent XML element is received from the parser and the content particles are matched against the DFA graph to determine whether the content particles are valid.

Hardware Overview

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for streaming validation of eXtensible Markup Language (XML) documents, the method comprising the steps of:

initializing a stack configured for storing stack-elements;
storing at least one stack-element on top of the stack, wherein the at least one stack-element indicates at least a validation state, relative to an XML schema that defines the structure of an XML document, for the XML document;
receiving a particular event of a series of events which is generated as the XML document is parsed by a parser, wherein the particular event indicates that the parser has encountered a particular part of the XML document;
receiving the particular part of the XML document from the parser;
determining a current validation state for the XML document relative to the XML schema, wherein determining the current validation state for the XML document comprises:
retrieving information that is stored in a current stack-element that is on top of the stack of stack elements; and
based on the retrieved information, performing the steps of:
determining that the particular part of the XML document is a content particle;
determining a particular content particle type that corresponds to the content particle;
based at least on the particular content particle type that corresponds to the content particle, validating the particular part of the XML document against the XML schema;

wherein the steps of the method are performed by one or more computer systems.

2. The method of claim 1, wherein the step of validating the particular part of the XML document comprises maintaining the stack of stack-elements, wherein the stack-elements indicate schema components of the XML schema against which parts of the XML document are validated.

3. The method of claim 2, further comprising:
before receiving the particular event, receiving a start-element event of the series of events, wherein:
the start-element event indicates that that the parser has encountered an XML element of the XML document; and
the particular part of the XML document is a sub-element of the XML element;
wherein the step of maintaining the stack of stack-elements comprises:
generating one or more stack-elements, wherein the one or more stack-elements indicate one or more schema components that are associated with the XML element; and
storing the one or more stack-elements on the stack, wherein the one or more stack-elements include the current stack-element that is on top of the stack.

4. The method of claim 3, further comprising:
receiving an end-element event of the series of events, wherein the end-element event indicates that the parser has completed parsing the XML element;
wherein the step of maintaining the stack of stack-elements comprises removing the one or more stack-elements from the stack in response to receiving the end-element event.

5. The method of claim 1, further comprising:
receiving a second particular part, of the XML document, that is an XML element;
wherein receiving the second particular part of the XML document comprises receiving a content of the XML element; and
based on a stack-element that is currently on top of the stack, determining that the XML element is associated with a simple XML type, wherein the stack-element includes at least one value referencing at least one schema component, of the XML schema, that includes a definition of the XML element; and
validating the XML element by checking the content of the XML element to determine whether the content conforms to the definition of the XML element.

6. The method of claim 1, further comprising:
receiving a second particular part, of the XML document, that is an XML element; and
based on a stack-element that is currently on top of the stack, determining that the XML element is associated with a complex XML type.

7. The method of claim 6, wherein:
the stack-element that is currently on top of the stack includes at least one value referencing at least one schema component of the XML schema, wherein the at least one schema component includes a definition of the XML element which indicates that the XML element includes content having a simple XML type;
the step of receiving the second particular part of the XML document comprises receiving the content of the XML element; and
the method further comprises the step of validating the second particular part of the XML document by checking the content of the XML element to determine whether the content conforms to the definition of the XML element.

8. The method of claim 6, wherein:
the stack-element that is currently on top of the stack includes at least one value referencing at least one schema component of the XML schema, wherein the at least one schema component includes a definition of the XML element which indicates that the XML element includes a set of attributes;
the step of receiving the second particular part of the XML document comprises receiving one or more attributes that are included in the XML element; and
the method further comprises the step of validating the second particular part of the XML document by checking the one or more attributes to determine whether the one or more attributes conform to the definition of the XML element.

9. The method of claim 8, wherein:
the one or more attributes include a specific attribute that overrides the complex XML type of the XML element with a different XML type; and
the step of validating the second particular part of the XML document further comprises at least one of:
modifying the information stored in the stack-element that is currently on top of the stack to indicate a different validation state that reflects the different XML type; and
modifying the stack-element that is currently on top of the stack to include one or more different values that reference one or more different schema components of the XML schema, wherein the one or more different schema components include a different definition of the XML element which indicates that the XML element is associated with the different XML type.

10. The method of claim 6, wherein:
the stack-element that is currently on top of the stack includes at least one value referencing at least one schema component of the XML schema, wherein the at least one schema component includes a definition of the XML element which indicates that the XML element includes a set of content particles;
the step of receiving the second particular part of the XML document comprises receiving one or more content particles that are included in the XML element; and
the method further comprises the step of validating the second particular part of the XML document by validating the one or more content particles against the definition of the XML element.

11. The method of claim 10, wherein the step of validating the second particular part of the XML document further comprises:
generating one or more stack-elements, wherein the one or more stack-elements include one or more values referencing one or more schema components that include a particular definition of a particular content particle of the one or more content particles;
storing the one or more stack-elements on the stack; and
removing the one or more stack-elements from the stack when validation of the particular content particle is completed.

12. The method of claim 1, wherein:
the current validation state indicates that the particular part of the XML document is an XML element, wherein the XML element is an element particle included in a parent XML element;

the current stack-element includes:
  an occurrence count indicating the number of already validated XML elements that are the same element particles of the parent XML element as the XML element; and
  at least one value referencing at least one schema component of the XML schema, wherein the at least one schema component includes a definition of the XML element;
the step of receiving the particular part of the XML document comprises receiving the XML element; and
the step of validating the particular part of the XML document further comprises validating the XML element against the definition of the XML element, wherein validating the XML element includes:
  if the XML element conforms to the definition, then incrementing the occurrence count; and
  if the XML element does not conform to the definition, then removing the current stack-element from the stack.

13. The method of claim 1, wherein:
the current validation state indicates that the particular part of the XML document is an XML element, wherein the XML element is a choice particle included in a parent XML element;
the current stack-element includes:
  a reference to a list of entries, wherein each entry represents a sub-element included in the XML element;
  an occurrence count indicating the number of already validated XML elements that are the same choice particles of the parent XML element as the XML element; and
  at least one value referencing at least one schema component of the XML schema, wherein the at least one schema component includes a definition of the XML element;
the step of receiving the particular part of the XML document comprises receiving at least one sub-element included in the XML element; and
the step of validating the particular part of the XML document further comprises validating the XML element against the definition of the XML element, wherein validating the XML element includes at least one of:
  for at least one sub-element included in the XML element, creating an entry representing that sub-element and inserting that entry in the list of entries;
  for each entry in the list of entries, validating at least one sub-element included in the XML element, wherein if one sub-element conforms to the definition of the XML element, then the occurrence count is incremented; and
  after processing all sub-elements included in the XML element, removing the current stack-element from the stack.

14. The method of claim 1, wherein:
the current validation state indicates that the particular part of the XML document is an XML element, wherein the XML element is a sequence particle included in a parent XML element;
the current stack-element includes:
  a reference to a list of entries, wherein each entry represents a sub-element included in the XML element;
  an occurrence count indicating the number of already validated XML elements that are the same sequence particles of the parent XML element as the XML element; and
  at least one value referencing at least one schema component of the XML schema, wherein the at least one schema component includes a definition of the XML element;
the step of receiving the particular part of the XML document comprises receiving all sub-elements included in the XML element; and
the step of validating the particular part of the XML document further comprises validating the XML element against the definition of the XML element, wherein validating the XML element includes:
  for each sub-element included in the XML element, creating an entry representing that sub-element and inserting that entry in the list of entries;
  based on the list of entries, validating each sub-element included in the XML element, wherein if all sub-elements conform to the definition of the XML element, then the occurrence count is incremented; and
  after processing all sub-elements included in the XML element, removing the current stack-element from the stack.

15. The method of claim 1, wherein:
the current validation state indicates that the particular part of the XML document is an XML element, wherein the XML element is a validate-all particle included in a parent XML element;
the current stack-element includes:
  a reference to a list of entries, wherein each entry represents a sub-element included in the XML element;
  an occurrence count indicating the number of already validated XML elements that are the same validate-all particles of the parent XML element as the XML element; and
  at least one value referencing at least one schema component of the XML schema, wherein the at least one schema component includes a definition of the XML element;
the step of receiving the particular part of the XML document comprises receiving each sub-element included in the XML element; and
the step of validating the particular part of the XML document further comprises validating the XML element against the definition of the XML element, wherein validating the XML element includes:
  for each sub-element included in the XML element, creating an entry representing that sub-element and inserting that entry in the list of entries;
  looping through each entry in the list of entries and validating each sub-element represented by that entry; and
  after validating all sub-elements included in the XML element, removing the current stack-element from the stack.

16. The method of claim 1, wherein:
the current validation state indicates that the particular part of the XML document is an XML element, wherein the XML element is a group particle of the included in a parent XML element;
the current stack-element includes:
  a reference to a list of entries, wherein each entry represents a sub-element included in the XML element;
  an occurrence count indicating the number of already validated XML elements that are the same group particles of the parent XML element as the XML element; and a value referencing a schema component of the XML schema, wherein the schema component includes a definition of the XML element;
the step of receiving the particular part of the XML document comprises receiving each sub-element included in the XML element; and
the step of validating the particular part of the XML document further comprises validating the XML element against the definition of the XML element, wherein validating the XML element includes:
for each sub-element included in the XML element, creating an entry representing that sub-element and inserting that entry in the list of entries;
based on the value referencing the schema component included in the current stack-element, determining one or more schema components of the XML schema, wherein the one or more schema components include definitions for each sub-element of the XML element;
looping through each entry in the list of entries and validating each sub-element represented by that entry against a corresponding definition for that sub-element included in the one or more schema components; and
after validating all sub-elements included in the XML element, removing the current stack-element from the stack.

17. The method of claim 1, wherein:
the current validation state indicates that the particular part of the XML document is an XML element, wherein the XML element is a validate-any particle included in a parent XML element;
the current stack-element includes:
an occurrence count indicating the number of already validated XML elements that are validate-any particles of the parent XML element; and
at least one value referencing at least one schema component of the XML schema, wherein the at least one schema component includes a definition of the XML element;
the step of receiving the particular part of the XML document comprises receiving the XML element; and
the step of validating the particular part of the XML document further comprises validating the XML element against the definition of the XML element, wherein validating the XML element includes:
determining a namespace definition for the XML element based on the definition of the XML element included in the at least one schema component;
if the XML element conforms to the namespace definition, then incrementing the occurrence count; and
removing the current stack-element from the stack.

18. The method of claim 1, wherein the particular event indicates that the parser has encountered an XML element that is associated with a validation type which is one of a simple XML type, a complex XML type, and a content particle type.

19. The method of claim 1, wherein the step of receiving the particular event, the step of receiving the particular part of the XML document, the step of determining the current validation state, and the step of validating the particular part of the XML document are performed by a streaming validator implemented as part of a database server.

20. A computer system for streaming validation of eXtensible Markup Language (XML) documents, comprising:
one or more processors;
a machine-readable storage medium configured for storing a stack of stack-elements, wherein the stack-elements indicate validation states for an XML document being validated and indicate schema components of an XML schema, wherein the XML schema defines the structure of the XML document; and
one or more stored sequences of instructions which, when performed by the one or more processors, cause the one or more processors to execute a validation driver that is operatively connected to the stack, wherein the validation driver is configured to:
initialize the stack;
store at least one stack-element on top of the stack, wherein the at least one stack-element indicates at least one validation state for the XML document;
receive, from a parser, a series of events which is generated as the XML document is parsed by the parser, wherein the series of events includes at least one event which indicates that the parser has encountered at least one part of the XML document; and
for a particular part of the XML document:
receive the particular part of the XML document from the parser;
determine a current validation state for the XML document relative to the XML schema, wherein to determine the current validation state for the XML document the validation driver is configured to:
retrieve information that is stored in a current stack-element that is on top of the stack; and
based on the information, determine that the particular part of the XML document is a content particle and determine a particular content particle type that corresponds to the content particle;
validate the particular part of the XML document against the XML schema based at least on the particular content particle type that corresponds to the content particle.

21. The computer system of claim 20, wherein the one or more stored sequences of instructions further comprise instructions which, when performed by the one or more processors, cause the one or more processors to execute:
a simple type validator, wherein the simple type validator is operatively connected to the stack and is configured to validate XML elements associated with a simple XML type;
a complex type validator, wherein the complex type validator is operatively connected to the stack and is configured to validate XML elements associated with a complex XML type; and
a content particle validator, wherein the content particle validator is operatively connected to the stack and is configured to validate XML elements associated with a content particle type;
wherein, for each of said at least one part of the XML document, the validation driver is configured to:
determine a validation type of said at least one part based on a validation state that is indicated in a stack-element that is currently on top of the stack; and
based on the validation type, dispatch said at least one part for validation to one of the simple type validator, the complex type validator, and the content particle validator.

22. The computer system of claim 20, wherein the validation driver is further configured to:
receive a request from an application to validate the XML document;

generate a validation result that indicates whether the XML document was validated successfully based on the validation of the at least one part of the XML document; and send the validation result to the application.

23. The computer system of claim 20, wherein the validation driver is configured to transmit the series of events received from the parser to an event consumer, wherein for each of said at least one part of the XML document, the validation driver is configured to:

generate a validation result that indicates whether said at least one part of the XML document was validated successfully; and augment a specific event of the series of events to include the validation result, wherein the specific event indicates that the parser has completed parsing said at least one part.

24. A non-transitory machine-readable storage medium storing one or more sequences of instructions for streaming validation of eXtensible Markup Language (XML) documents, wherein the one or more sequences of instructions, when executed by one or more processors, cause the one or more processors to perform steps comprising:

initializing a stack configured for storing stack-elements;

storing at least one stack-element on top of the stack, wherein the at least one stack-element indicates at least a validation state, relative to an XML schema that defines the structure of an XML document, for the XML document;

receiving a particular event of a series of events which is generated as the XML document is parsed by a parser, wherein the particular event indicates that the parser has encountered a particular part of the XML document;

receiving the particular part of the XML document from the parser;

determining a current validation state for the XML document relative to the XML schema, wherein determining the current validation state for the XML document comprises:

retrieving information that is stored in a current stack-element that is on top of the stack of stack elements; and based on the retrieved information, performing the steps of:

determining that the particular part of the XML document is a content particle;

determining a particular content particle type that corresponds to the content particle;

based at least on the particular content particle type that corresponds to the content particle, validating the particular part of the XML document against the XML schema.

25. The non-transitory machine-readable storage medium of claim 24, wherein the instructions that cause validating the particular part of the XML document comprise instructions which, when executed by the one or more processors, cause the one or more processors to perform maintaining the stack of stack-elements, wherein the stack-elements indicate schema components of the XML schema against which parts of the XML document are validated.

26. The non-transitory machine-readable storage medium of claim 25, wherein the one or more sequences of instructions further comprise instructions which, when executed by the one or more processors, cause the one or more processors to perform:

before receiving the particular event, receiving a start-element event of the series of events, wherein:

the start-element event indicates that that the parser has encountered an XML element of the XML document; and the particular part of the XML document is a sub-element of the XML element;

wherein the instructions that cause maintaining the stack of stack-elements comprise instructions which, when executed by the one or more processors, cause the one or more processors to perform:

generating one or more stack-elements, wherein the one or more stack-elements indicate one or more schema components that are associated with the XML element; and storing the one or more stack-elements on the stack, wherein the one or more stack-elements include the current stack-element that is on top of the stack.

27. The non-transitory machine-readable storage medium of claim 26, wherein the one or more sequences of instructions further comprise instructions which, when executed by the one or more processors, cause the one or more processors to perform:

receiving an end-element event of the series of events, wherein the end-element event indicates that the parser has completed parsing the XML element;

wherein the instructions that cause maintaining the stack of stack-elements further comprise instructions which, when executed by the one or more processors, cause the one or more processors to perform removing the one or more stack-elements from the stack in response to receiving the end-element event.

28. The non-transitory machine-readable storage medium of claim 24, wherein the one or more sequences of instructions further comprise instructions which, when executed by the one or more processors, cause the one or more processors to perform:

receiving a second particular part, of the XML document, that is an XML element;

wherein the instructions that cause receiving the second particular part of the XML document comprise instructions which, when executed by the one or more processors, cause the one or more processors to perform receiving a content of the XML element;

based on a stack element that is currently on top of the stack, determining that the XML element is associated with a simple XML type, wherein the stack-element includes at least one value referencing at least one schema component, of the XML schema, that includes a definition of the XML element; and validating the XML element by checking the content of the XML element to determine whether the content conforms to the definition of the XML element.

29. The non-transitory machine-readable storage medium of claim 24, wherein the one or more sequences of instructions further comprise instructions which, when executed by the one or more processors, cause the one or more processors to perform:

receiving a second particular part, of the XML document, that is an XML element; and based on a stack-element that is currently on top of the stack, determining that the XML element is associated with a complex XML type.

30. The non-transitory machine-readable storage medium of claim 29, wherein:

the stack-element that is currently on top of the stack includes at least one value referencing at least one schema component of the XML schema, wherein the at least one schema component includes a definition of the XML element which indicates that the XML element includes content having a simple XML type;

the instructions that cause receiving the second particular part of the XML document comprise instructions which, when executed by the one or more processors, cause the one or more processors to perform receiving the content of the XML element; and the one or more sequences of instructions further comprise instructions which, when executed by the one or more processors, cause the one or more processors to perform validating the second particular part of the XML document by checking the content of the XML element to determine whether the content conforms to the definition of the XML element.

31. The non-transitory machine-readable storage medium of claim 29, wherein:

the stack-element that is currently on top of the stack includes at least one value referencing at least one schema component of the XML schema, wherein the at least one schema component includes a definition of the XML element which indicates that the XML element includes a set of attributes;

the instructions that cause receiving the second particular part of the XML document comprise instructions which, when executed by the one or more processors, cause the one or more processors to perform receiving one or more attributes that are included in the XML element; and the one or more sequences of instructions further comprise instructions which, when executed by the one or more processors, cause the one or more processors to perform validating the second particular part of the XML document by checking the one or more attributes to determine whether the one or more attributes conform to the definition of the XML element.

32. The non-transitory machine-readable storage medium of claim 31, wherein:

the one or more attributes include a specific attribute that overrides the complex XML type of the XML element with a different XML type; and the instructions that cause validating the second particular part of the XML document further comprise instructions which, when executed by the one or more processors, cause the one or more processors to perform at least one of:

modifying the information stored in the stack-element that is currently on top of the stack to indicate a different validation state that reflects the different XML type; and modifying the stack-element that is currently on top of the stack to include one or more different values that reference one or more different schema components of the XML schema, wherein the one or more different schema components include a different definition of the XML element which indicates that the XML element is associated with the different XML type.

33. The non-transitory machine-readable storage medium of claim 29, wherein:

the stack-element that is currently on top of the stack includes at least one value referencing at least one schema component of the XML schema, wherein the at least one schema component includes a definition of the XML element which indicates that the XML element includes a set of content particles;

the instructions that cause receiving the second particular part of the XML document comprise instructions which, when executed by the one or more processors, cause the one or more processors to perform receiving one or more content particles that are included in the XML element; and the one or more sequences of instructions further comprise instructions which, when executed by the one or more processors, cause the one or more processors to perform validating the second particular part of the XML document by validating the one or more content particles against the definition of the XML element.

34. The non-transitory machine-readable storage medium of claim 33, wherein the instructions that cause validating the second particular part of the XML document further comprise instructions which, when executed by the one or more processors, cause the one or more processors to perform:

generating one or more stack-elements, wherein the one or more stack-elements include one or more values referencing one or more schema components that include a particular definition of a particular content particle of the one or more content particles;

storing the one or more stack-elements on the stack; and removing the one or more stack-elements from the stack when validation of the particular content particle is completed.

35. The non-transitory machine-readable storage medium of claim 24, wherein:

the current validation state indicates that the particular part of the XML document is an XML element, wherein the XML element is an element particle included in a parent XML element;

the current stack-element includes:

an occurrence count indicating the number of already validated XML elements that are the same element particles of the parent XML element as the XML element; and at least one value referencing at least one schema component of the XML schema, wherein the at least one schema component includes a definition of the XML element;

the instructions that cause receiving the particular part of the XML document comprise instructions which, when executed by the one or more processors, cause the one or more processors to perform receiving the XML element; and the instructions that cause validating the particular part of the XML document further comprise instructions which, when executed by the one or more processors, cause the one or more processors to perform validating the XML element against the definition of the XML element, wherein validating the XML element includes:

if the XML element conforms to the definition, then incrementing the occurrence count; and if the XML element does not conform to the definition, then removing the current stack-element from the stack.

36. The non-transitory machine-readable storage medium of claim 24, wherein:

the current validation state indicates that the particular part of the XML document is an XML element, wherein the XML element is a choice particle included in a parent XML element;

the current stack-element includes:

a reference to a list of entries, wherein each entry represents a sub-element included in the XML element;

an occurrence count indicating the number of already validated XML elements that are the same choice particles of the parent XML element as the XML element; and at least one value referencing at least one schema component of the XML schema, wherein the at least one schema component includes a definition of the XML element;
the instructions that cause receiving the particular part of the XML document comprise instructions which, when executed by the one or more processors, cause the one or more processors to perform receiving at least one sub-element included in the XML element; and
the instructions that cause validating the particular part of the XML document further comprise instructions which, when executed by the one or more processors, cause the one or more processors to perform validating the XML element against the definition of the XML element, wherein validating the XML element includes at least one of:
for at least one sub-element included in the XML element, creating an entry representing that sub-element and inserting that entry in the list of entries;
for each entry in the list of entries, validating at least one sub-element included in the XML element, wherein if one sub-element conforms to the definition of the XML element, then the occurrence count is incremented; and
after processing all sub-elements included in the XML element, removing the current stack-element from the stack.

37. The non-transitory machine-readable storage medium of claim 24, wherein:
the current validation state indicates that the particular part of the XML document is an XML element, wherein the XML element is a sequence particle included in a parent XML element;
the current stack-element includes:
a reference to a list of entries, wherein each entry represents a sub-element included in the XML element;
an occurrence count indicating the number of already validated XML elements that are the same sequence particles of the parent XML element as the XML element; and
at least one value referencing at least one schema component of the XML schema, wherein the at least one schema component includes a definition of the XML element;
the instructions that cause receiving the particular part of the XML document comprise instructions which, when executed by the one or more processors, cause the one or more processors to perform receiving all sub-elements included in the XML element; and
the instructions that cause validating the particular part of the XML document further comprise instructions which, when executed by the one or more processors, cause the one or more processors to perform validating the XML element against the definition of the XML element, wherein validating the XML element includes:
for each sub-element included in the XML element, creating an entry representing that sub-element and inserting that entry in the list of entries;
based on the list of entries, validating each sub-element included in the XML element, wherein if all sub-elements conform to the definition of the XML element, then the occurrence count is incremented; and
after processing all sub-elements included in the XML element, removing the current stack-element from the stack.

38. The non-transitory machine-readable storage medium of claim 24, wherein:
the current validation state indicates that the particular part of the XML document is an XML element, wherein the XML element is a validate-all particle included in a parent XML element;
the current stack-element includes:
a reference to a list of entries, wherein each entry represents a sub-element included in the XML element;
an occurrence count indicating the number of already validated XML elements that are the same validate-all particles of the parent XML element as the XML element; and
at least one value referencing at least one schema component of the XML schema, wherein the at least one schema component includes a definition of the XML element;
the instructions that cause receiving the particular part of the XML document comprise instructions which, when executed by the one or more processors, cause the one or more processors to perform receiving each sub-element included in the XML element; and
the instructions that cause validating the particular part of the XML document further comprise instructions which, when executed by the one or more processors, cause the one or more processors to perform validating the XML element against the definition of the XML element, wherein validating the XML element includes:
for each sub-element included in the XML element, creating an entry representing that sub-element and inserting that entry in the list of entries;
looping through each entry in the list of entries and validating each sub-element represented by that entry; and
after validating all sub-elements included in the XML element, removing the current stack-element from the stack.

39. The non-transitory machine-readable storage medium of claim 24, wherein:
the current validation state indicates that the particular part of the XML document is an XML element, wherein the XML element is a group particle included in a parent XML element;
the current stack-element includes:
a reference to a list of entries, wherein each entry represents a sub-element included in the XML element;
an occurrence count indicating the number of already validated XML elements that are the same group particles of the parent XML element as the XML element; and
a value referencing a schema component of the XML schema, wherein the schema component includes a definition of the XML element;
the instructions that cause receiving the particular part of the XML document comprise instructions which, when executed by the one or more processors, cause the one or more processors to perform receiving each sub-element included in the XML element; and
the instructions that cause validating the particular part of the XML document further comprise instructions which, when executed by the one or more processors, cause the one or more processors to perform validating the XML element against the definition of the XML element, wherein validating the XML element includes:
for each sub-element included in the XML element, creating an entry representing that sub-element and inserting that entry in the list of entries;

based on the value referencing the schema component included in the current stack-element, determining one or more schema components of the XML schema, wherein the one or more schema components include definitions for each sub-element of the XML element;
looping through each entry in the list of entries and validating each sub-element represented by that entry against a corresponding definition for that sub-element included in the one or more schema components; and
after validating all sub-elements included in the XML element, removing the current stack-element from the stack.

40. The non-transitory machine-readable storage medium of claim 24, wherein:
the current validation state indicates that the particular part of the XML document is an XML element, wherein the XML element is a validate-any particle included in a parent XML element;
the current stack-element includes:
an occurrence count indicating the number of already validated XML elements that are validate-any particles of the parent XML element; and
at least one value referencing at least one schema component of the XML schema, wherein the at least one schema component includes a definition of the XML element;
the instructions that cause receiving the particular part of the XML document comprise instructions which, when executed by the one or more processors, cause the one or more processors to perform receiving the XML element; and
the instructions that cause validating the particular part of the XML document further comprise instructions which, when executed by the one or more processors, cause the one or more processors to perform validating the XML element against the definition of the XML element, wherein validating the XML element includes:
determining a namespace definition for the XML element based on the definition of the XML element included in the at least one schema component;
if the XML element conforms to the namespace definition, then incrementing the occurrence count; and
removing the current stack-element from the stack.

41. The non-transitory machine-readable storage medium of claim 24, wherein the particular event indicates that the parser has encountered an XML element that is associated with a validation type which is one of a simple XML type, a complex XML type, and a content particle type.

42. The non-transitory machine-readable storage medium of claim 24, further storing a set of instructions which, when executed by the one or more processors, cause the one or more processors to execute a database server, wherein:
the one or more sequences of instructions for streaming validation of the XML documents are configured as a streaming validator that is implemented as part of the database server; and
the one or more sequences of instructions for streaming validation of the XML documents are included in the set of instructions for executing the database server.

\* \* \* \* \*

UNITED STATES PATENT AND TRADEMARK OFFICE
CERTIFICATE OF CORRECTION

| | |
|---|---|
| PATENT NO. | : 7,992,081 B2 |
| APPLICATION NO. | : 11/407508 |
| DATED | : August 2, 2011 |
| INVENTOR(S) | : Medi et al. |

It is certified that error appears in the above-identified patent and that said Letters Patent is hereby corrected as shown below:

In column 1, line 16, delete "extensible" and insert -- eXtensible --, therefor.

In column 4, line 60, delete "Structure" and insert -- Structural --, therefor.

In column 13, line 34, delete "describer" and insert -- described --, therefor.

In column 21, line 35, after "of the" insert -- content particle, the process of validating the parts of the element content particle may include one or more, and possibly recursive, calls to one or more validator modules of the streaming validator, such as, for example, the simple type validator module, the complex type validator module, and the content particle validator module.) If the validation of the parts of the element content particle succeeds, the content particle validator module increments the occurrence count stored in the top stack-element, generates a validation result indicating a successful validation, reports the validation result, and proceeds to process the next part of XML document. Otherwise, the content particle validator module generates a validation result indicating a failed validation. After the validation of the parts of the element content particle is completed, the content particle validator module adjusts the stack by removing one or more stack-elements from the stack. In addition, the content particle validator module may also generate and/or log the validation result.

Validating Choice Content Particles

A content particle of "CHOICE" content particle type is an XML element that may include one or more parts, or sub-elements. An example of a definition of a choice content particle according to the XML Schema Specification is provided in the schema component below:

<choice
id = ID

Signed and Sealed this
Twenty-ninth Day of November, 2011

David J. Kappos
*Director of the United States Patent and Trademark Office*

```
maxOccurs = (nonNegativeInteger |unbounded) : 1
minOccurs =nonNegativeInteger: 1
{any attributes with non-schema namespace .. .}>
Content: (annotation?, (element |group |choice |sequence | any)*)
</choice>
```

As shown in the above example, the definition of a choice content particle may include a set of attributes including, but not limited to, an identifier attribute, a "minOccurs" attribute (which indicates the minimum number of times the content particle may occur in its --.

In column 23-24, line 54-67(Col. 23)1-28(Col. 24), after "element is" delete "content particle ... which indicates the minimum number of times the content particle may occur in its".

In column 33, line 11, in Claim 3, delete "that that" and insert -- that --, therefor.

In column 33, line 40, in Claim 5, after "element;" delete "and".

In column 36, line 59, in Claim 16, after "particle" delete "of the".

In column 40, line 1, in Claim 26, delete "that that" and insert -- that --, therefor.